(12) United States Patent
Kobayakawa

(10) Patent No.: US 7,599,436 B2
(45) Date of Patent: Oct. 6, 2009

(54) METHOD OF DETERMINING SEARCH REGION OF MOTION VECTOR AND MOTION VECTOR DETECTION APPARATUS

(75) Inventor: Takahiro Kobayakawa, Yokohama (JP)

(73) Assignee: Fujitsu Microelectronics Limited, Tokyo (JP)

( * ) Notice: Subject to any disclaimer, the term of this patent is extended or adjusted under 35 U.S.C. 154(b) by 1114 days.

(21) Appl. No.: 10/957,730

(22) Filed: Oct. 5, 2004

(65) Prior Publication Data
US 2005/0207493 A1    Sep. 22, 2005

(30) Foreign Application Priority Data
Mar. 18, 2004    (JP) .............................. 2004-077792

(51) Int. Cl.
H04N 7/12       (2006.01)
H04N 11/02      (2006.01)
H04N 11/04      (2006.01)
H04B 1/66       (2006.01)

(52) U.S. Cl. ................................. 375/240.16
(58) Field of Classification Search ....................... None
See application file for complete search history.

(56) References Cited

U.S. PATENT DOCUMENTS

| | | | | |
|---|---|---|---|---|
| 5,357,287 A * | 10/1994 | Koo et al. | .................... | 348/699 |
| 6,069,918 A * | 5/2000 | Meyer et al. | ............ | 375/240.17 |
| 6,212,237 B1 * | 4/2001 | Minami et al. | ......... | 375/240.16 |
| 6,377,623 B1 * | 4/2002 | Ra et al. | ..................... | 375/240 |
| 6,400,763 B1 * | 6/2002 | Wee | ....................... | 375/240.16 |
| 6,950,465 B1 * | 9/2005 | Yokoyama et al. | ..... | 375/240.12 |

FOREIGN PATENT DOCUMENTS

| JP | 4-150284 | 5/1992 |
|---|---|---|
| JP | 5-328333 | 12/1993 |
| JP | 6-225289 | 8/1994 |
| JP | 7-212764 | 8/1995 |
| JP | 7-288817 | 10/1995 |
| JP | 9-37269 | 2/1997 |
| JP | 9-163380 | 6/1997 |
| JP | 10-42298 | 2/1998 |
| JP | 11-239354 | 8/1999 |
| JP | 11-252571 | 9/1999 |

OTHER PUBLICATIONS

Office Action mailed Oct. 14, 2008 and issued in corresponding Japanese Patent Application No. 2004-077792.

* cited by examiner

*Primary Examiner*—Nhon T Diep
(74) *Attorney, Agent, or Firm*—Staas & Halsey LLP

(57) ABSTRACT

The present invention offers a method of determining a search region in a motion vector detection apparatus. According to this method, a search unit with a size and a ratio of height to width such that a search region made of an aggregation of the search units suitable for the configuration of the search region can be configured. In addition, a statistics amount of motion vectors that are already obtained in a vector information readout region of an original image with the position of an MB being processed as a center or in a vector information readout region in a region of a reference image with the position of an MB being processed as a center, is obtained. The appearance tendency of a motion vector is predicted by analyzing the statistics amount. The combination of search units is determined such that the search region is expanded in such a direction as to increase the occurrence probability of a motion vector for MB being processed on the basis of the obtained analysis.

16 Claims, 23 Drawing Sheets

| TENDENCY | | UNIT PATTERN |
|---|---|---|
| HORIZONTAL | VERTICAL | |
| LEFT SIDE | CENTRAL | 1. LEFT EXPANSION |
| RIGHT SIDE | CENTRAL | 2. RIGHT EXPANSION |
| CENTRAL | UPPER SIDE | 3. UPWARD EXPANSION |
| CENTRAL | LOWER SIDE | 4. DOWNWARD EXPANSION |
| LEFT SIDE | UPPER SIDE | 5. UPPER-LEFT EXPANSION |
| LEFT SIDE | LOWER SIDE | 6. LOWER-LEFT EXPANSION |
| RIGHT SIDE | UPPER SIDE | 7. UPPER-RIGHT EXPANSION |
| RIGHT SIDE | LOWER SIDE | 8. LOWER-RIGHT EXPANSION |

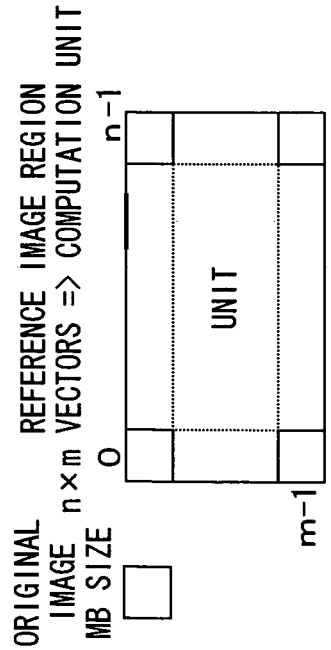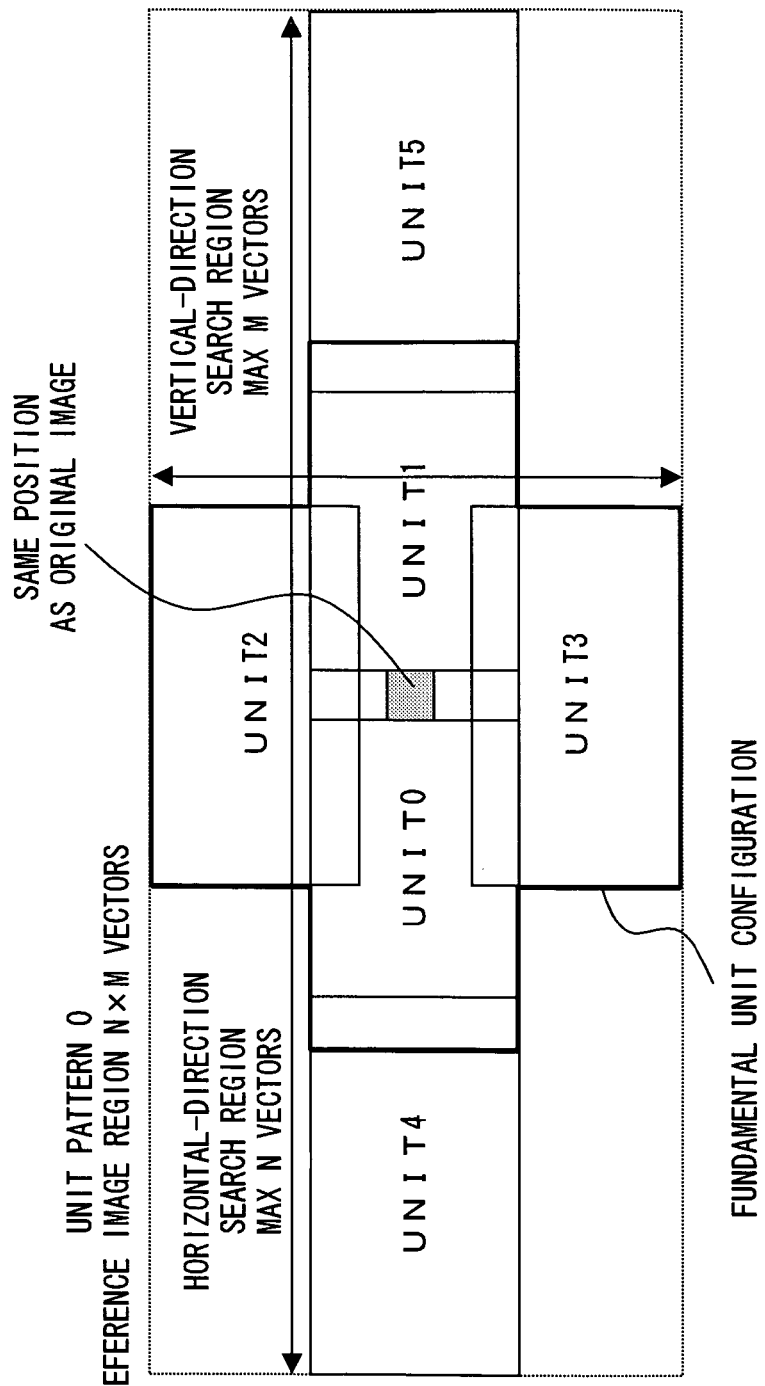
FIG. 3

STATISTICS INFORMATION

|  | HORIZONTAL COMPONENT | VERTICAL COMPONENT |
|---|---|---|
| MEAN VALUE | Avr_VecH | Avr_VecV |
| DISPERSION VALUE | Var_VecH | Var_VecV |

F I G. 7

(a) MEAN VALUE DETERMINATION THRESHOLD

|  | HORIZONTAL COMPONENT | | VERTICAL COMPONENT | |
|---|---|---|---|---|
|  | LEFT SIDE | RIGHT SIDE | UPPER SIDE | LOWER SIDE |
| MEAN VALUE THRESHOLD | BAHL | BAHR | BAVU | BAVD |

(b) DISPERSION VALUE DETERMINATION THRESHOLD

|  | HORIZONTAL COMPONENT | VERTICAL COMPONENT |
|---|---|---|
| DISPERSION VALUE THRESHOLD | BVH | BVV |

F I G. 8

(a) MEAN VALUE ANALYSIS

| HORIZONTAL COMPONENT (Avr_VecH) | DETERMINATION | VERTICAL COMPONENT (Avr_VecV) | DETERMINATION |
|---|---|---|---|
| LEFT SIDE OF BAHL | AHL | UPPER SIDE OF BAVU | AVU |
| RIGHT SIDE OF BAHR | AHR | LOWER SIDE OF BAVD | AVD |
| BETWEEN BAHL AND BAHR | AHC | BETWEEN BAVU AND BAVD | AVC |

(b) DISPERSION VALUE ANALYSIS

| HORIZONTAL COMPONENT (Var_VecH) | DETERMINATION | VERTICAL COMPONENT (Var_VecV) | DETERMINATION |
|---|---|---|---|
| EQUAL TO OR LESS BVH | VHH | EQUAL TO OR LESS THAN BV | VVH |
| GREATER THAN BVH | VHL | GREATER THAN BVV | VVL |

F I G. 9

TENDENCY PREDICTION

| HORIZONTAL COMPONENT TENDENCY | | | VERTICAL COMPONENT TENDENCY | | |
|---|---|---|---|---|---|
| MEAN VALUE | DISPERSION | TENDENCY | MEAN VALUE | DISPERSION | TENDENCY |
| AHL | VHH | LEFT SIDE | AVU | VVH | UPPER SIDE |
| AHR | VHH | RIGHT SIDE | AVD | VVH | LOWER SIDE |
| — | VHL | CENTER | — | VVL | CENTER |
| AHC | — | CENTER | AVC | — | CENTER |

FIG. 10

| TENDENCY | | UNIT PATTERN | |
|---|---|---|---|
| HORIZONTAL | VERTICAL | | |
| LEFT SIDE | CENTRAL | 1. LEFT EXPANSION | (FIG. 12) |
| RIGHT SIDE | CENTRAL | 2. RIGHT EXPANSION | |
| CENTRAL | UPPER SIDE | 3. UPWARD EXPANSION | (FIG. 13) |
| CENTRAL | LOWER SIDE | 4. DOWNWARD EXPANSION | |
| LEFT SIDE | UPPER SIDE | 5. UPPER-LEFT EXPANSION | (FIG. 14, 15) |
| LEFT SIDE | LOWER SIDE | 6. LOWER-LEFT EXPANSION | (NOT SHOWN IN DRAWING) |
| RIGHT SIDE | UPPER SIDE | 7. UPPER-RIGHT EXPANSION | (NOT SHOWN IN DRAWING) |
| RIGHT SIDE | LOWER SIDE | 8. LOWER-RIGHT EXPANSION | (FIG. 14, 15) |

FIG. 11

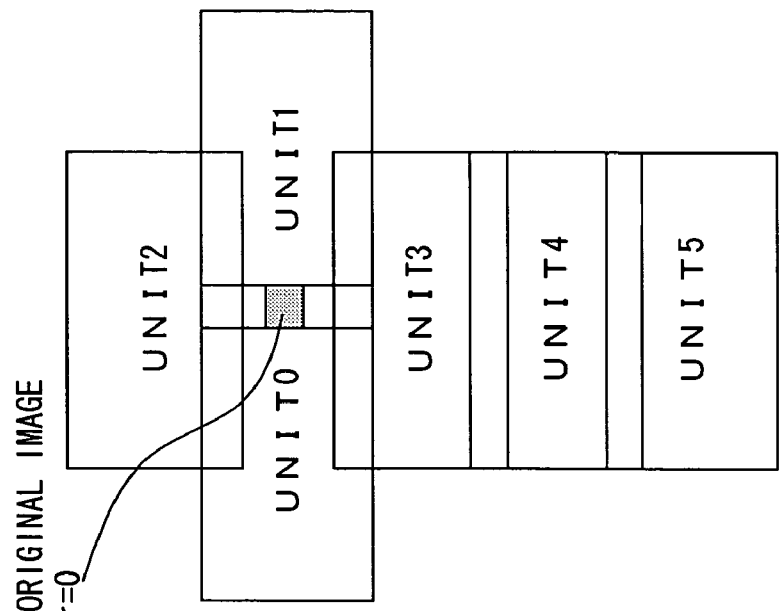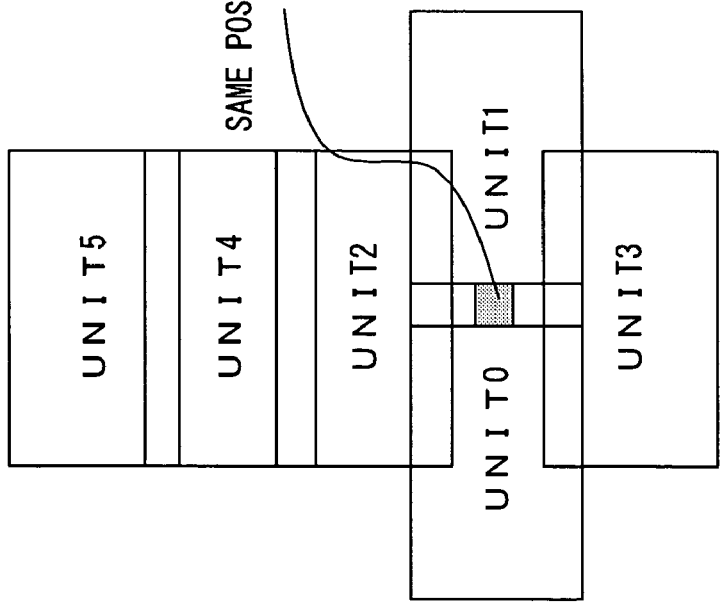
F I G. 13

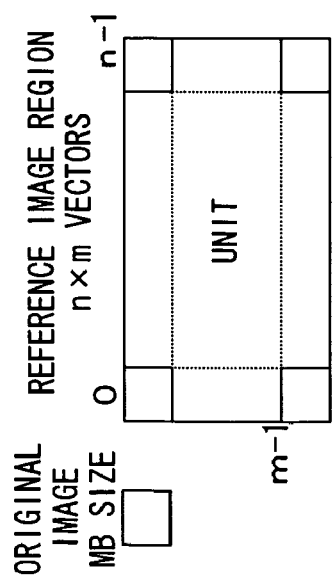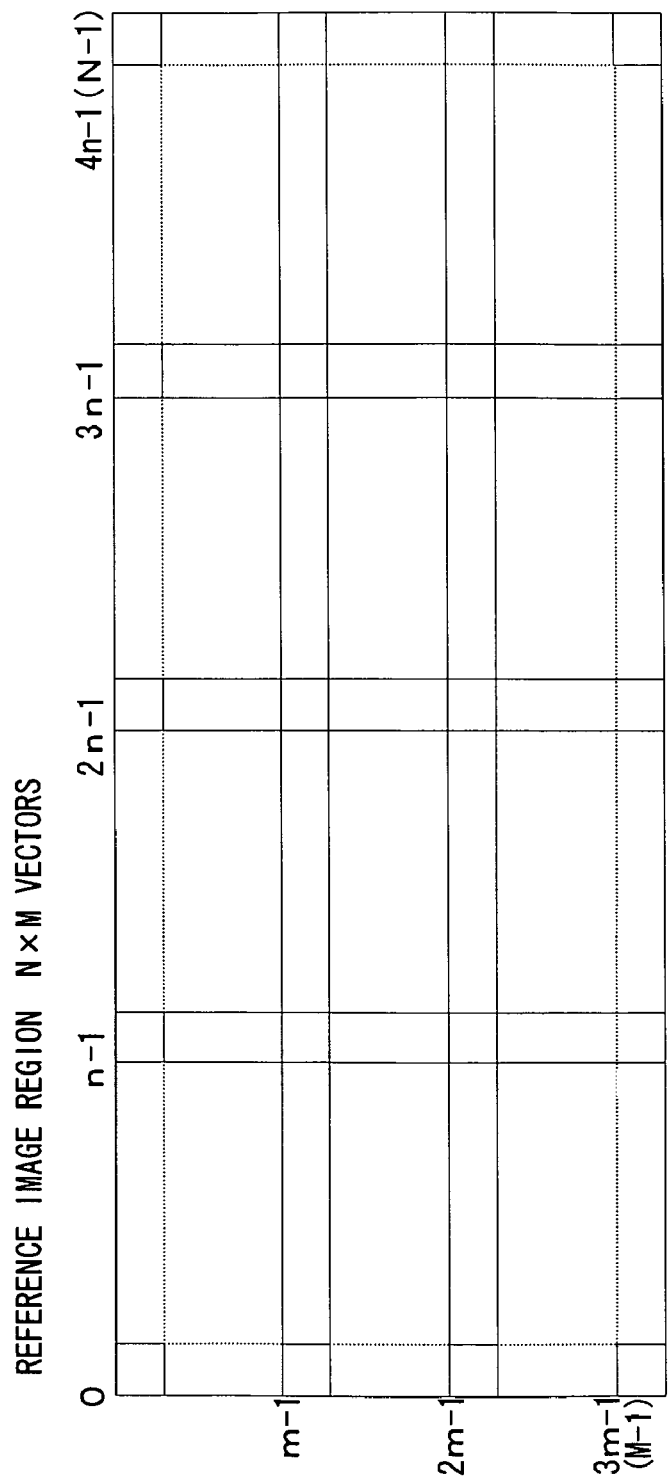
F I G. 2 1

METHOD OF DETERMINING SEARCH REGION OF MOTION VECTOR AND MOTION VECTOR DETECTION APPARATUS

BACKGROUND OF THE INVENTION

1. Field of the Invention

The present invention generally relates to a prediction-coding device for prediction-coding an image using a motion vector and more particularly relates to a method of determining the vector search region of a motion vector detection device for use in a prediction-coding device, etc.

2. Background of the Related Art

Recently, in the storage apparatuses of various kinds of optical disks such as a digital TV, a DVD, etc., the moving picture distribution on the Internet, the moving picture accumulation of a digital camera, etc., an MPEG (abbreviation of Moving Picture Experts Group that includes MPEG-1/MPEG-2/MPEG-4, etc.) that is standardized by ISO/IEC (International Eelectrotechnical Standardization Commission of International Standardization Organization) or H.261, H.262 and H264 that are standardized by ITU-T (Telecommunications Standardization Sector of International Telecommunication Union) are frequently adopted as compression coding methods of moving picture information.

In these coding methods, an information amount is compressed using the characteristic of a moving picture such that a correlation between frames that are continuous in terms of time is high. In order to obtain such a high correlation, motion vector detection between a coding frame and a reference frame that is present before or after the coding frame in terms of time is performed for each processing unit (referred to as as a macroblock and abbreviated to MB) of the coding frame.

In this method, the necessity for low consumption of electric power of a circuit increases as the above-mentioned coding apparatus becomes miniaturized and portable while the improvement of movement coding efficiency and the image quality of a coding movement image are required. Therefore, the simultaneous pursuit of these requirements becomes a problem.

Especially, the detection of a motion vector requires the largest processing computation amount among coding processings. Furthermore, the degree of the detection accuracy greatly influences both coding efficiency and image quality. Therefore, the present invention relates to the detection technology of a motion vector.

A motion vector is detected by performing a correlation estimation value computation between an original image MB and the data in a reference image region and by comparing the thus-obtained correlation estimation values. The correlation estimation value shows how many errors occur between the pixel data of an original image MB and the pixel data that is extracted in the form of an MB from a reference image region. A difference absolute value cumulative sum or a difference square cumulative sum, etc. are used as a correlation estimation value. The correlation estimation value is shifted for each pixel in the reference image as shown in FIG. 19 and the position in the reference image where the correlation estimation value becomes a minimum value is obtained as a motion vector.

In this case, it is a problem in which order is the most efficient order to search for the reference image in one frame. Namely, in a method of horizontally moving an original image MB for each pixel from one of the four corners of a reference image and vertically moving the MB for each pixel row, the correlation between frames is not considered at all so that this method is extremely inefficient. Generally it is thought that the movement of an image between adjacent frames is small. Therefore, a comparatively small region around the center of a reference image whose position corresponds to the position of an original image MB is searched. In the case where a block that the two images sufficiently agree with each other is not detected, the search region is expanded and a search operation is performed. In this case, the problem is how to expand a search region.

Furthermore, how to effectively detect a motion vector depends on how effectively a reference image data is inputted into a correlation estimation value computation device and how effectively the loss of a computation time is decreased, in this estimation value computation.

The applicant has already disclosed a technology of improving the responsiveness of this computation as an "image correlation apparatus" (refer to patent article 1). In this patent article 1, memory access and computation can be efficiently performed if a reference image region (search window) for performing a vector search for the square processing unit of an original image is a fixed square region.

FIG. 20 is a block diagram showing the configuration of an image correlation device (namely, motion vector detection device) of the patent article 1. In FIG. 20, a conventional image correlation device 1 comprises a frame memory 10 storing a plurality of frames including an original image and a reference image, an original image MB storage 12 storing an original image MB obtained from the frame memory 10, a reference image region storage 14 storing the reference image search region obtained from the frame memory 10, an original image delay adjuster 16 that delays, timing-adjusts and outputs an original image MB from the original image MB storage 12, a unit data timing adjuster 18 that timing-adjusts and outputs a reference image region from the reference image region storage 14 and a motion vector comparator 20 that simultaneously performs correlation estimation value computation of n images (the number of horizontal pixels of search region of reference image) on the basis of the image data outputted from the original image delay adjuster 16 and the unit data timing adjuster 18 and that detects a motion vector. For example, a reference image data read out from the reference image region storage 14 is timing-adjusted for the original image MB data and the reference image region of FIG. 19 using the unit data timing adjuster 18. Subsequently, the thus-adjusted data is inputted into n computation devices (correlation units), thereby simultaneously performing the computation of n horizontal vectors. Then, each computation device repeats this computation processing m times in a vertical vector search direction, thereby realizing the motion vector estimation value computation in the search region of horizontal n vectors×vertical m vectors without causing any computation loss time.

If the search region of a motion vector is expanded from n×m vectors to N×M vectors (N>n, M>m) in order to increase the detection accuracy of a vector, the circuit scale or the computation processing time becomes (N×M)/(n×m) times.

FIG. 21 shows one example of a conventional search region expansion method. Like FIG. 21, if N=4*n and M=3*m are set and the search region is expanded four times in a horizontal direction and three times in a vertical direction, the computation processing amount becomes 12 (4*3) times. In this case, if a processing is performed using the same circuit configuration as that of the above-mentioned patent article 1, the circuit scale becomes four times larger while the processing time becomes three times larger.

Furthermore, as the means for expanding a search region, there is a method of predicting a motion vector detection position and searching for the periphery of the prediction region like FIG. 22. In the case where a prediction position is wrong, there is the possibility that wrong detection of a motion vector becomes high.

Furthermore, in order to efficiently detect a motion vector without decreasing detection accuracy, a technology of filtering a video signal in interlace fashion using a characteristic such that the horizontal direction is stronger than the vertical direction is disclosed (patent article 2). In this method, detection is effectively performed by extracting the characteristic amounts in a standard block and a candidate block to be computed and by decreasing the number of sample pixels in one MB to be estimation-computed. Therefore, the conventional methods are the same as the present invention in the pursuit of the efficiency of motion vector detection. However, the way of solving the problem is fairly different since the present invention concentrates on the improvement of a method of expanding a search region.

[Patent article 1] Japanese laid-open patent publication No. 10-42,298 (pages 5 and 6, FIG. 1)

[Patent article 2] Japanese laid-open patent publication No. 07-212,764 (page 3, FIG. 1)

In the case where the movement search region of a motion vector is expanded as mentioned above, the scale and the consumption of electric power of a circuit increase as a computation processing amount increases. In the case where a prediction position is simply restricted and vector detection is performed, there arises a problem in the accuracy of detection results.

The present invention aims at providing a method, an apparatus and a program of motion vector detection for enabling vector detection with high accuracy by determining the search region of a motion vector on the basis of the analysis of a statistics amount of the previously obtained motion vector and by performing a vector search in a wide area while controlling the expansion of a computation amount and a circuit scale.

The present invention aims at providing a prediction coding device using a motion vector detection apparatus that can perform highly accurate vector detection in a wide region while controlling the expansion of a computation amount and a circuit scale by appropriately expanding the search region of a motion vector.

SUMMARY OF THE INVENTION

In a motion vector detection apparatus for, in order to obtain a motion vector between a reference image and a current original image, comparing and searching for search regions of the reference image with a position corresponding to a macroblock (MB) as a center, in which the original image is processing, in the MB, a step of determining the search region comprising:

determining a search unit with a size and a ratio of height to width such that the search region made up of an aggregation of search units suitable for the configuration of the search region can be configured;

obtaining a statistics amount of motion vectors that are already obtained in a vector information readout region of an original image with the position of an MB being processed as a center or in a vector information readout region of a reference image with the position of an MB in processing as a center;

analyzing the statistics amount, thereby predicting the appearance tendency of a motion vector; and deciding the combination of search units in such a way that the search region is expanded in a direction to increase the occurrence probability of a motion vector for MB being processed on the basis of the obtained analysis.

The obtaining-statistics-amount step includes a step of calculating a vector mean value and a vector dispersion value of the motion vector that are already obtained in the vector information reading region. The analysis step includes a step of performing an analysis on the basis of a mean value threshold and a dispersion value threshold predetermined for the vector mean value and the vector dispersion value, respectively.

A mean value threshold includes the thresholds on the left and right sides of a horizontal component and the thresholds on the upper and lower sides of a vertical component. A dispersion value threshold comprises the horizontal dispersion value threshold of a horizontal component and the vertical dispersion value threshold of a vertical component.

The analysis step comprises a step of assigning horizontal classification including a left side, a right side and a horizontal center as comparison results of the horizontal component of a vector mean value, the left-side threshold and the right-side threshold; and a step of assigning vertical classification including an upper side, a lower side and a vertical center as the comparison results of the vertical component of a vector mean value, the upper-side threshold and the lower-side threshold. According to the determination step, a unit pattern obtained by expanding a search unit may be selected in a direction based on the horizontal classification and the vertical classification.

In a preferred embodiment, the analysis step comprises a step of assigning horizontal classification including a left side, a right side and a horizontal center as the comparison results of the horizontal component of a vector mean value, the left-side threshold and the right-side threshold; a step of assigning vertical classification including an upper side, a lower side and a vertical center as the comparison results of the vertical component of a vector mean value, the upper-side threshold and the lower-side threshold; a step of obtaining a horizontal dispersion determination value showing whether or not the horizontal component of a vector dispersion value is greater than a horizontal dispersion value threshold and a vertical dispersion determination value showing whether or not the vertical component of a vector dispersion value is greater than the vertical dispersion value threshold; and a step of obtaining a horizontal component tendency in a horizontal direction in which an appearance tendency of a motion vector is represented by one of a right-side, a center and a left-side using the combination of horizontal classification and a horizontal dispersion determination value and of obtaining a vertical component tendency in a vertical direction in which an appearance tendency of a motion vector is represented by one of an upper-side, a center and a lower-side using the combination of vertical classification and the vertical dispersion determination value. In the determination step, a unit pattern obtained by expanding a search unit in a direction determined by the combination of the horizontal component tendency and the vertical component tendency, is selected.

BRIEF EXPLANATION OF THE DRAWINGS

FIG. 3 shows the basic concept of search region expansion according to the present invention;

FIG. 7 shows a table of the mean value and the dispersion value of motion vectors obtained for the vector information reading-out regions shown in FIG. 5 or 6;

FIG. 8 shows tables of a mean value determination threshold (a) and a dispersion value determination threshold (b) that are used for the analysis of a mean value and a dispersion value;

FIG. 9 shows tables of determination that is carried out in the mean value analysis and the dispersion value analysis that are carried out in step 530 of FIG. 4;

FIG. 10 shows a table for performing motion vector appearance tendency prediction using the result of the mean value analysis and the dispersion value analysis that are performed on the basis of the tables of FIG. 9;

FIG. 11 shows a unit pattern determination table for determining the expansion direction of a unit pattern using a combination of the horizontal component tendency and the vertical component tendency of a tendency prediction table of FIG. 10;

FIG. 13 shows examples of reference image region expansion in a vertical direction;

FIG. 21 shows one example of a conventional search region expansion method; and

DETAILED DESCRIPTION OF THE PREFERRED EMBODIMENTS

The following is the detailed explanation of the present invention by referring to the preferred embodiments and the attached drawings of the present invention. The same item number shown in a plurality of drawings indicates the same element.

Figure 1:
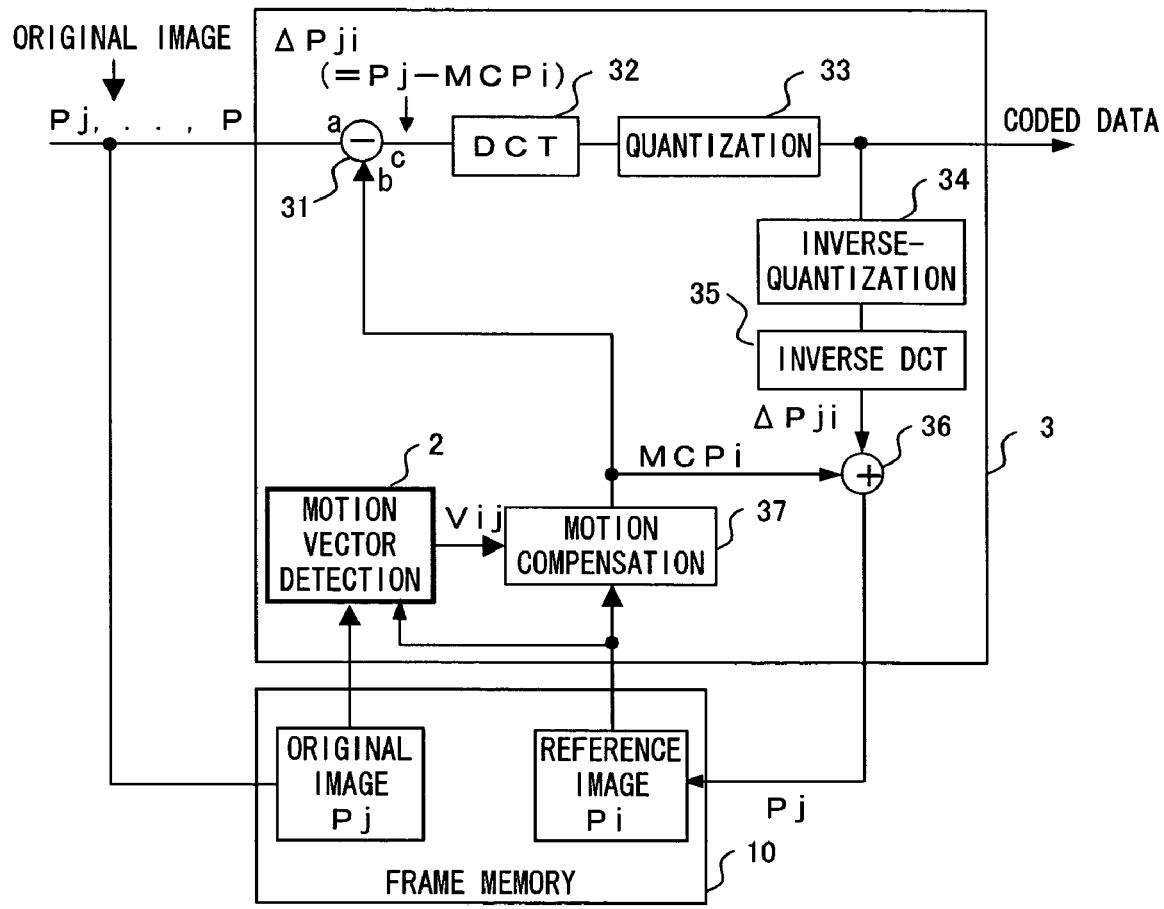
FIG. 1 shows a block diagram conceptually showing the configuration of a prediction coding apparatus for detecting a motion vector, thereby prediction-coding a moving picture according to the present invention.

FIG. 1 is a block diagram conceptually showing the configuration of a prediction-coding apparatus for detecting a motion vector, thereby prediction-coding a moving picture according to the present invention. In FIG. 1, a prediction coding apparatus 3 is used with a frame memory 10 for storing a plurality of frames in a moving picture to be coded and a moving picture that is coded once and decoded again. According to the present invention, the prediction coding apparatus 3 comprises a motion vector detection device 2 for obtaining a motion vector from a frame (referred to as "original image") that is stored in the frame memory 10 to be coded and a frame (referred to as "reference image") that is once coded and then decoded; a motion compensation device 37 for performing the motion compensation of an image that is coded once in the frame memory 10 using the output of the motion vector detection device 2; a subtractor 31 for calculating the difference between moving picture data to be decoded and the frame data that is motion-compensated by the motion compensation device 37; a DCT circuit 32 for performing DCT (Discrete Cosine Transform) to the output of the subtractor 31; a quantization device 33 for quantizing the output of the DCT circuit 32; a inverse quantization device 34 for inverse-quantizing the output of the quantization device 33; a inverse DCT circuit 35 for performing inverse DCT for the output of the inverse quantization device 34; and an adder 36 for adding the output of the inverse DCT circuit 35 and that of the motion compensation device 37.

Among the constituent elements of the prediction coding apparatus 3, elements other than the vector detection device 2 of the present invention may be ordinary well-known elements. In other words, the vector detection device 2 of the present invention can apply to a prediction coding apparatus of any type if this apparatus performs prediction coding using a motion vector.

Next, the operations of the prediction coding apparatus 3 are explained. In FIG. 1, moving picture data to be coded is input into a minuend terminal 31a of the subtractor 31 and it is stored in the frame memory 10 at the same time. The motion vector detection device 2 of the present invention obtains a motion vector Vij between frames Pi and Pj that are continuously processed based on the principle of the present invention as is described later in detail and it supplies the obtained vector to the motion compensation device 37. The motion compensation device 37 motion-compensates the once-coded image (namely, reference image Pi') data on the basis of a motion vector Vij from the vector detection device 2. This motion-compensated image (hereinafter, referred to as "motion compensation reference image MCPi") is supplied to the subtractor 31 and also to the adder 36. The subtractor 31 subtracts the motion compensation reference image MCPi obtained by motion-compensating a reference image in the motion compensation device 37 from the original image Pj that is a current frame, thereby obtaining difference data $\Delta$ Pji (=Pj–MCPi). This difference data $\Delta$ Pji is supplied to the DCT circuit 32 and then a DCT process is performed for the supplied data. The output of the DCT apparatus 32 is supplied to the quantization device 33 and the supplied output is quantized. The output of a quantization device 108 is used as the output of the prediction coding apparatus 3.

Furthermore, the DCT-performed and quantized difference data is supplied to the inverse quantization device 34 and the inverse DCT circuit 35. Then, the thus-supplied data is restored to the original difference data (referred to as "restoration difference data $\Delta$ Pji'"), thereby supplying the restored data to the adder 36. The adder 36 adds the restoration difference data ΔPji from the inverse DCT circuit 35 to a reference image that is motion-compensated by the motion compensation device 37, that is, the motion compensation reference image MCPi, thereby obtaining the image data of a current frame (namely, new reference image Pj'). The thus-obtained image data of a current frame is stored in the frame memory 10 as the next reference image.

Thus, difference data ΔPji between the motion compensation reference image MCPi that is motion-compensated on the basis of the motion vector Vij and a current frame Pj is coded by the prediction coding apparatus 3. Then, the motion vector detection device 2 of the present invention is explained.

Figure 2:
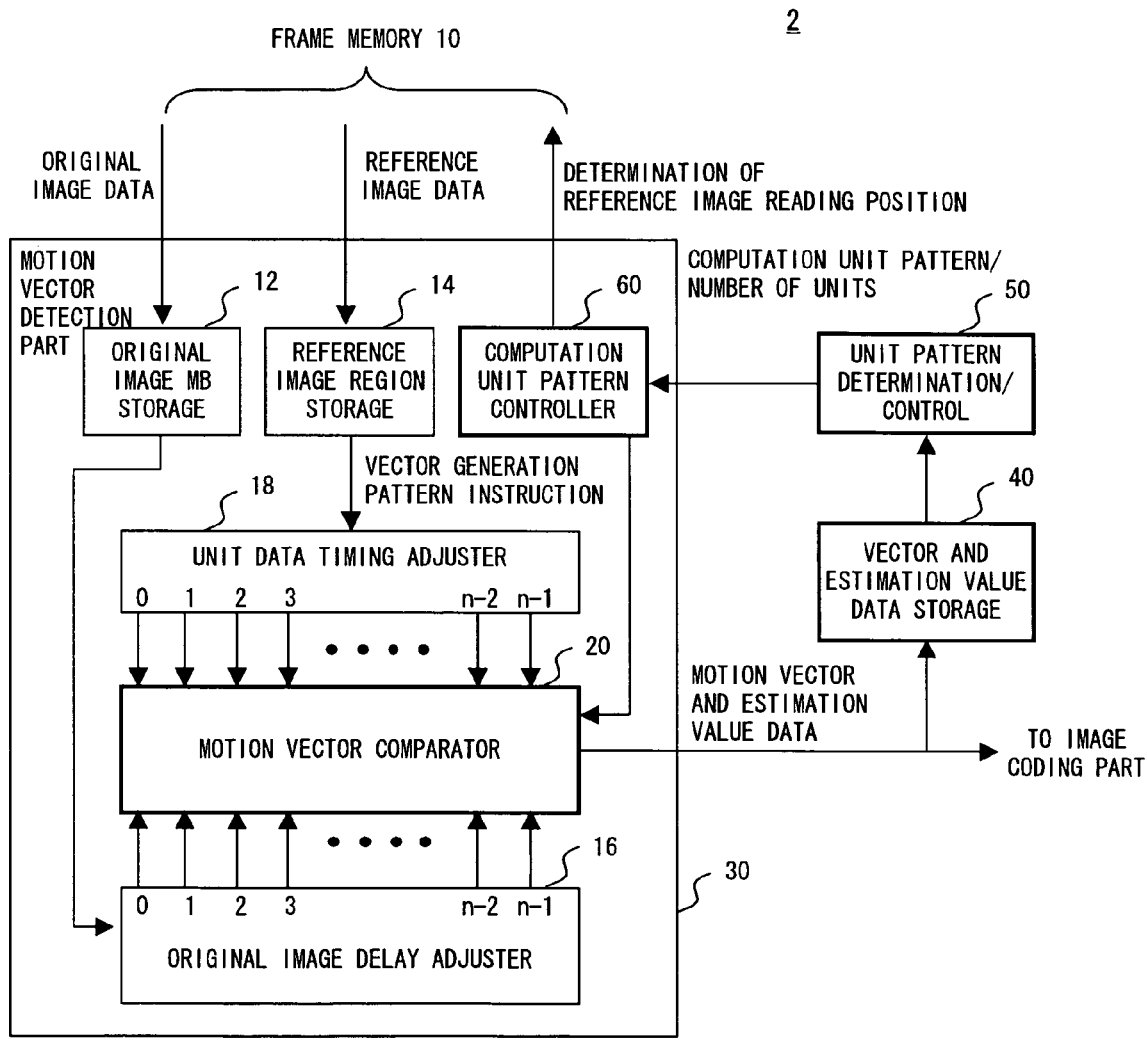
FIG. 2 shows a block diagram of a motion vector detection apparatus for determining a search region with high reliability and performing effective motion vector detection based on statistics information according to one preferred embodiment of the present invention.
Figure 20:
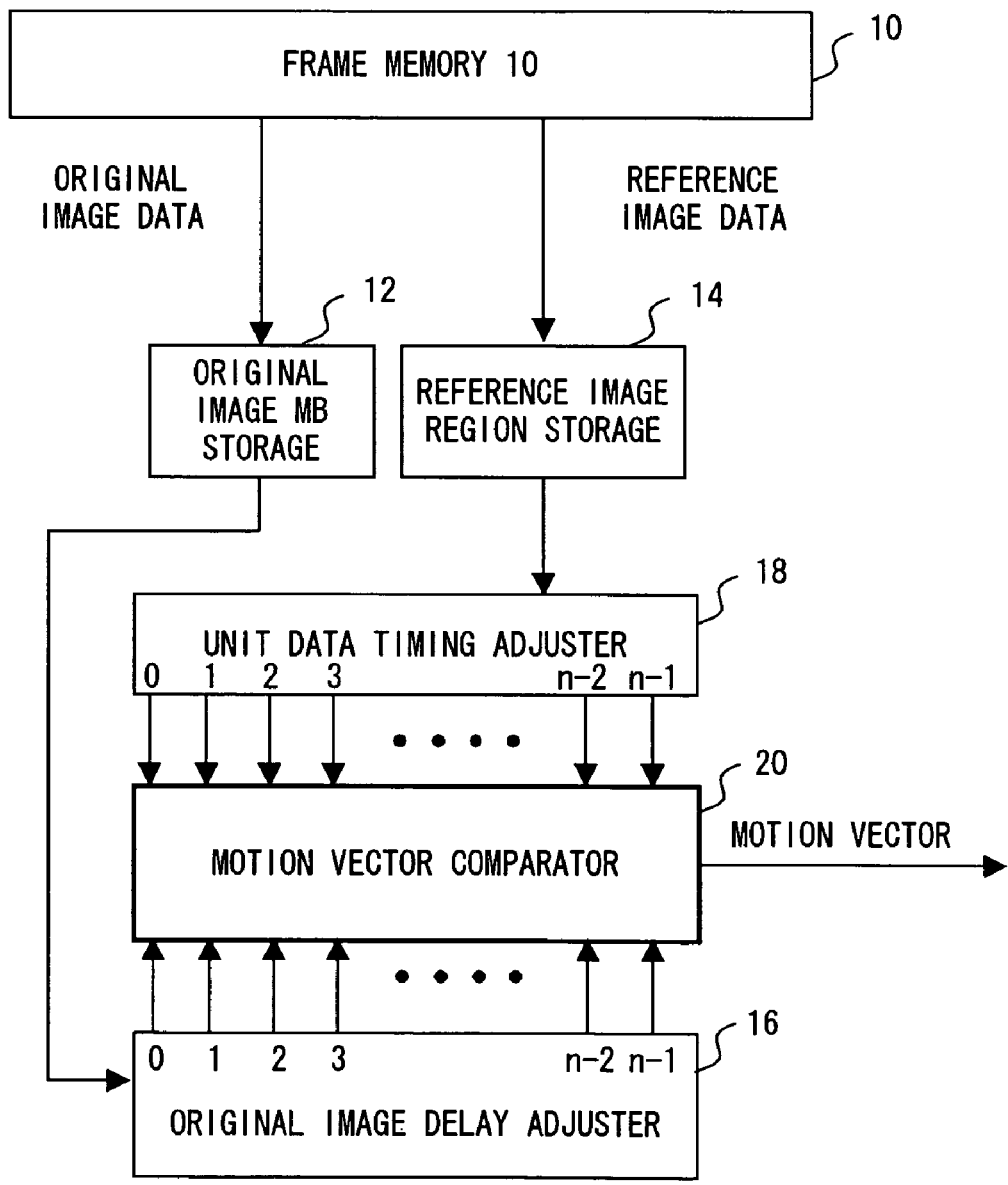
FIG. 20 is a block diagram showing the configuration of the image correlation device (that is, motion vector detection device) of an image correlation device of the patent article 1.
Figure 22:
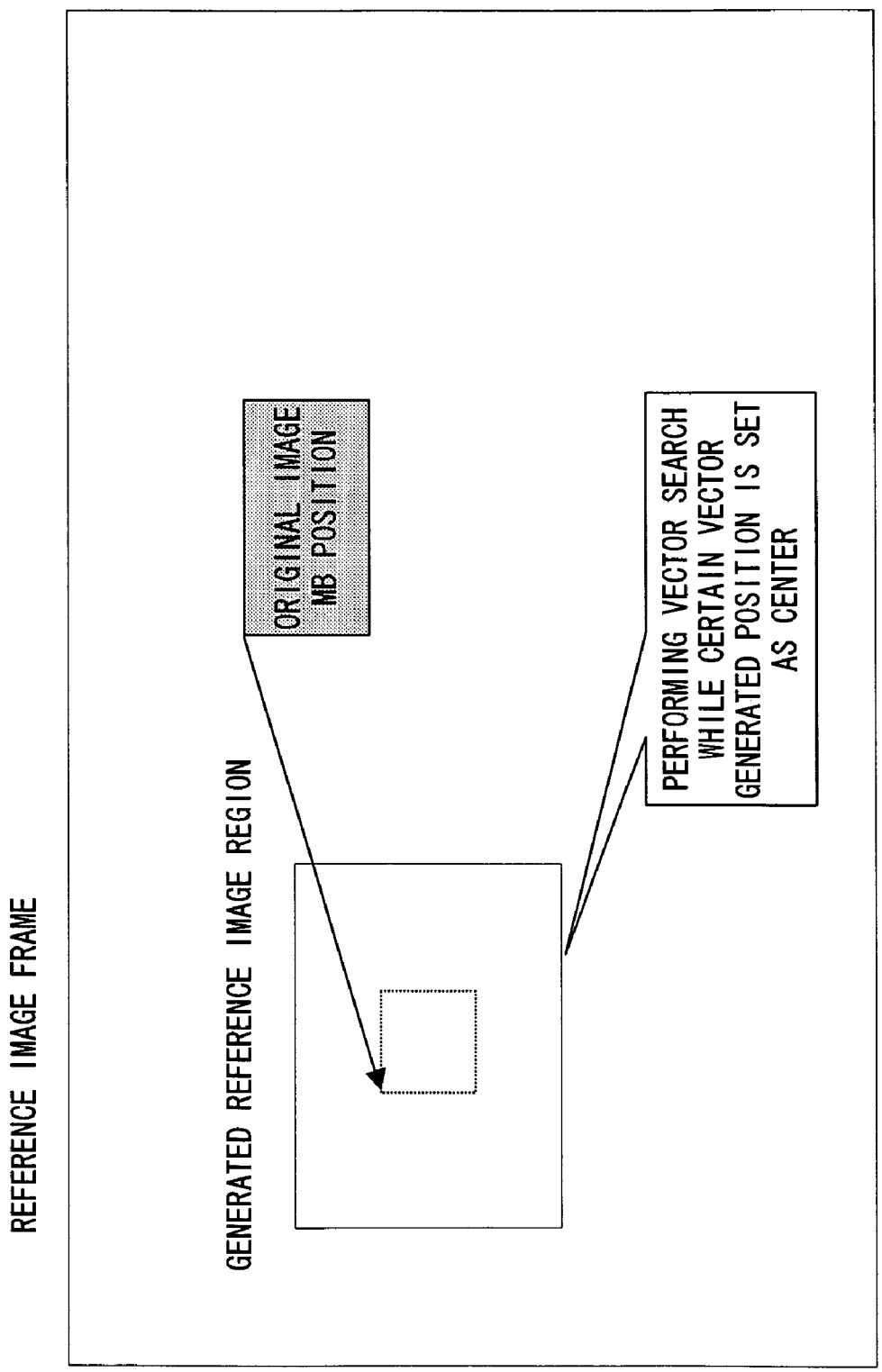
FIG. 22 shows how to predict a motion vector detection position and how to search for the periphery of the prediction region.

FIG. 2 is a block diagram showing the configuration of a motion vector detection device for determining a search region with high reliability on the basis of statistics information, thereby performing efficient motion vector detection according to one embodiment of the present invention. The motion vector detection device 2 of the present invention is the same as the conventional motion vector detection device 1 of FIG. 20 except for the following configuration. As shown in FIG. 2, the motion vector detection device 2 comprises a vector and estimation value data storage 40 that stores for each processed MB the processing results such as a motion vector, the minimum value of a correlation estimation value, etc.; a unit pattern determination/control 50 for reading out the processing result of an optional MB position from the vector and estimation value data storage 40, performing a statistics processing for the read-out results, determining a search expansion direction and determining the unit pattern of a search region; and a computation unit pattern controller 60 for determining a region of reading a reference image for each unit in accordance with the computation unit pattern and also the unit number that are determined by the unit pattern determination/control 50, for performing a control for reading the reference image region from a frame memory into the inside reference image region storage unit and for instructing the occurrence pattern of a vector of each unit to a motion vector comparator 20. The following is the explanation of the present invention focusing on the vector and estimation value data storage 40, the unit pattern determination/control 50 and the computation unit pattern controller 60 that are characteristics of the present invention.

The vector and estimation value data storage 40 stores, processing results such as a motion vector, the minimum value of a correlation estimation value, etc. for each processed MB. For example, a memory inside the unit pattern determination/control 50 may be used instead. The unit pattern determination/control 50 not only determines a unit pattern for determining a search region but also performs the control of the whole motion vector detection device 2. The 50 performs an analysis using the values obtained by statistically processing a motion vector that is a previous processing result (for example, the mean value/maximum value/minimum value of a motion vector), the minimum value of a correlation estimation value, etc., thereby determining a unit pattern so as to expand a search region in a direction where a vector occurrence ratio becomes higher. The computation unit pattern controller 60 determines the reading region of a reference image for each unit in accordance with the unit position information that is determined and instructed by the unit pattern determination/control 50, performs a control for reading the reference image region into the inside reference image region storage 14 from the frame memory 10 and instructs the occurrence pattern of a vector of each unit to the vector comparator 20. The parts other than the unit pattern determination/control 50 are generally materialized by hardware.

However, it is preferable to configure the unit pattern determination/control 50 using a microcomputer that operates under the control of a program stored in the storage apparatus.

According to the present invention, the vector and estimation value data storage 40 for storing the calculated vector information is provided, considering the nature of a motion vector that a temporal correlation and a spatial correlation are high. Furthermore, this part reads out from the storage 40 the vector information of a frame that is processed immediately before in terms of time and also the vector information about a periphery MB on the same frame of an MB to be processed, statistically predicts the occurrence tendency of a motion vector and performs a vector search while concentrating on a region with a high vector appearance tendency.

Principle of the Invention

Figure 5:
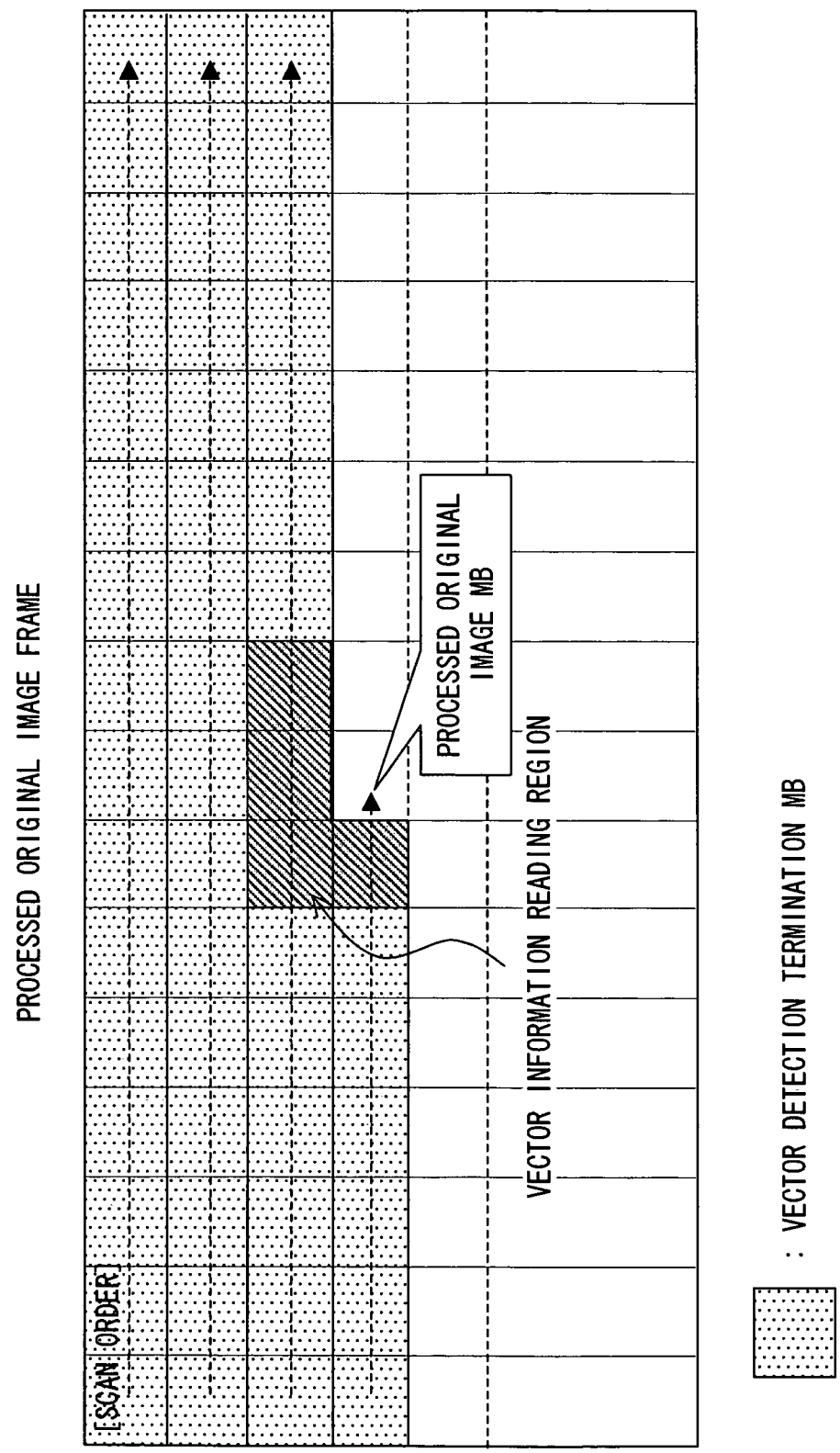
FIG. 5 shows one example of reading out the information regarding the MB in a region in which an original image has been processed.

FIG. 3 shows a basic concept of the search region expansion according to the present invention. According to the present invention, the search unit (computation unit) of n×m pixels is set as the minimum unit to search for a reference image as shown in FIG. 5. The search region of a reference image is configured by combining search units.

For example, regarding the movement of a camera that catches a moving picture, there is a characteristic that there are many movements of panning in a horizontal direction or a vertical direction and the appearance probability of a vector in an oblique direction is low. Using this characteristic, a vector computation processing amount in an oblique direction is decreased and a vector in a direction with higher priority is weighted, thereby determining the search region of a vector. For example, in FIG. 3, a reference image region is obtained by combining four horizontal units and two vertical units while an original image MB is set as a center. In this way, the expansion of a computation processing amount which expansion is equal to six times of an n×m search region accurately realizes a highly accurate vector search of the region of almost N×M vectors.

Furthermore, the fundamental unit configuration comprises four units 0 to 3 including two units 0 and 1 on the left and right sides and two units 2 and 3 on the upper side and lower side while the position corresponding to the original image MB is set as a center as shown in FIG. 3. A number is assigned to each of the units in the order of search priority. Therefore, units are searched for in the order of unit numbers. The following is the detailed explanation of the operations of the vector detection device 2.

Meanwhile, it is preferable that the size and the ratio of height to width of a search unit are suitably determined so as to configure the search region.

One Preferred Embodiment

Figure 4A:
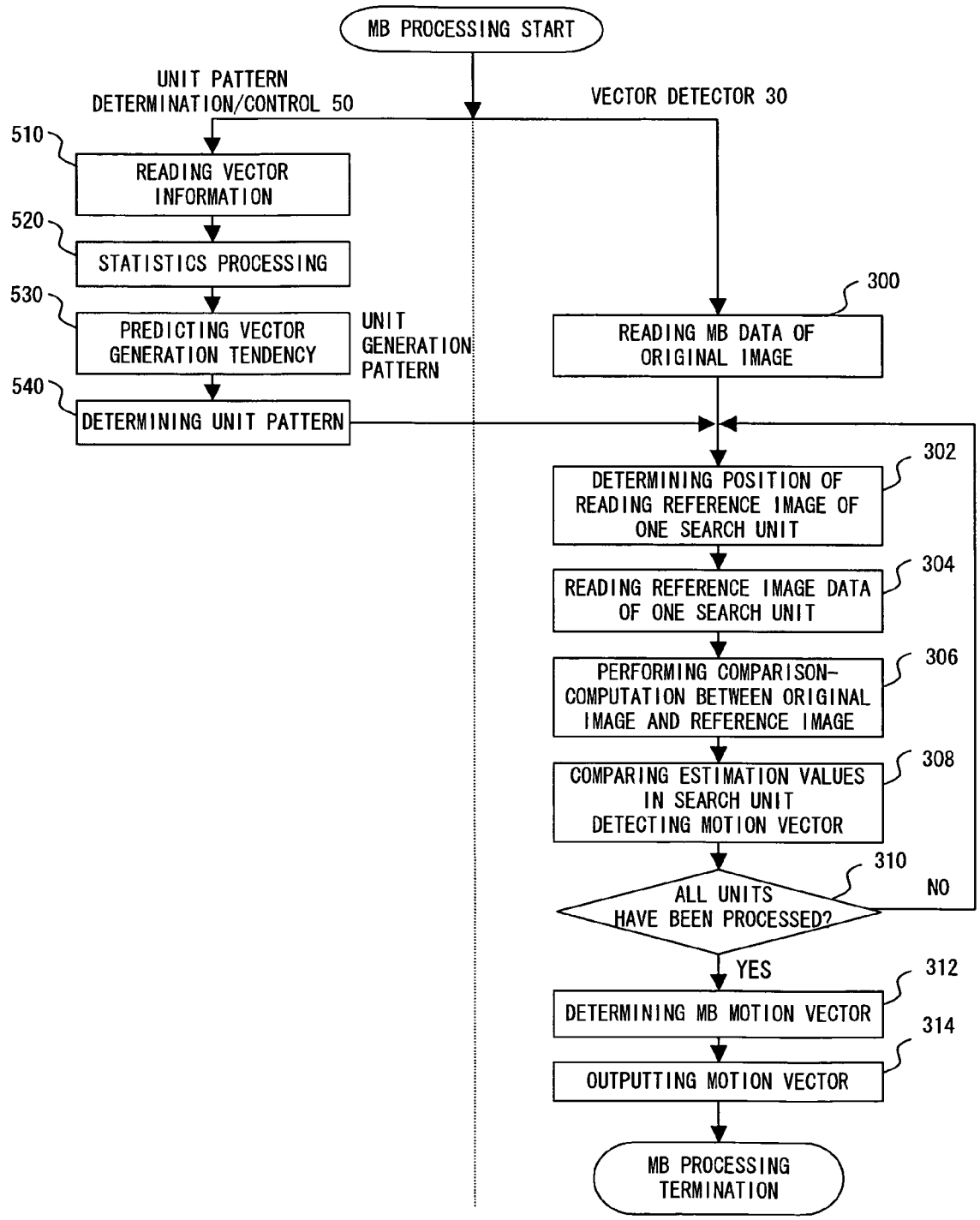
FIG. 4A is a flowchart of the operations of a motion vector detection device 2 of FIG. 2.
Figure 4B:
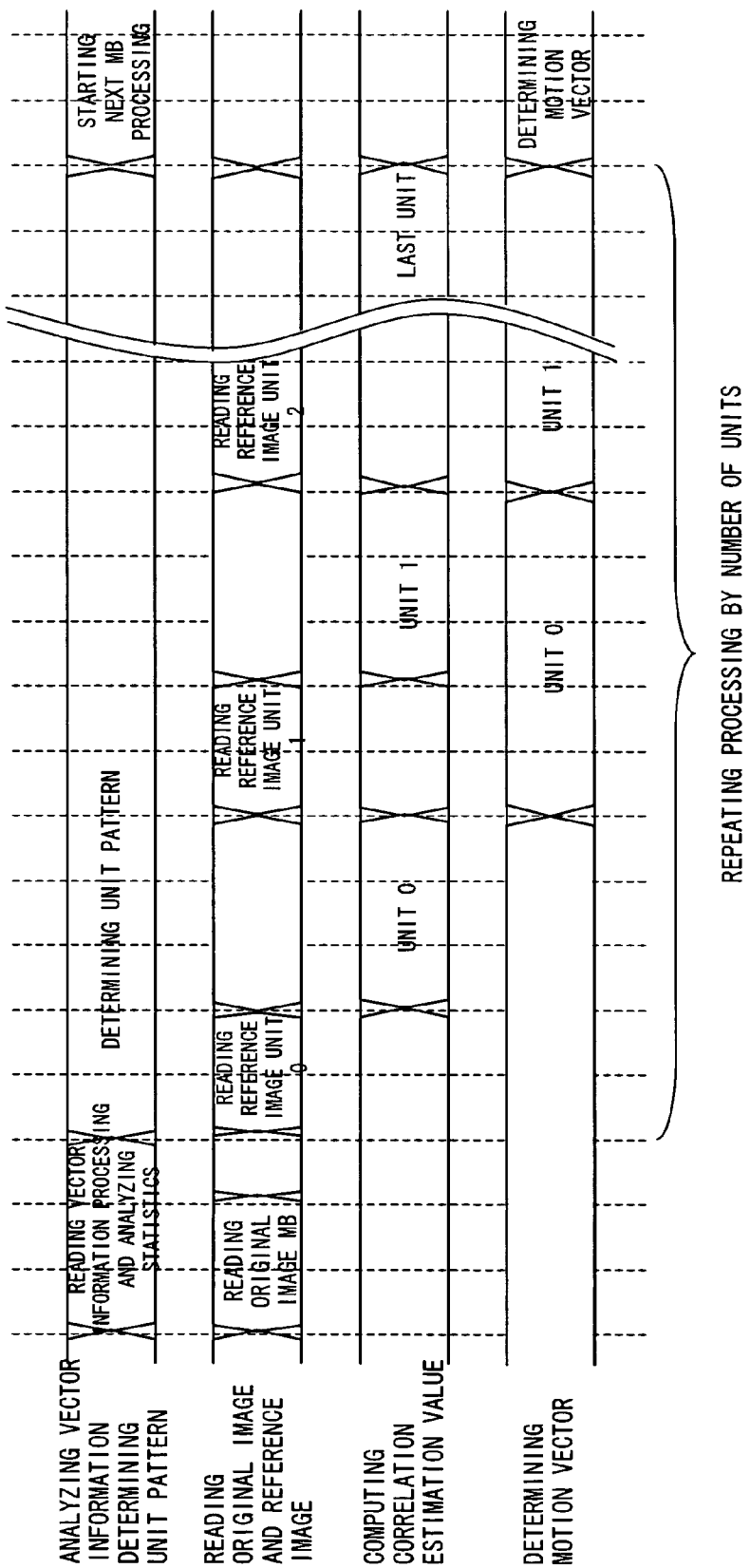
FIG. 4B is a time chart of the operations of a motion vector detection device 2 of FIG. 2.
Figure 6:
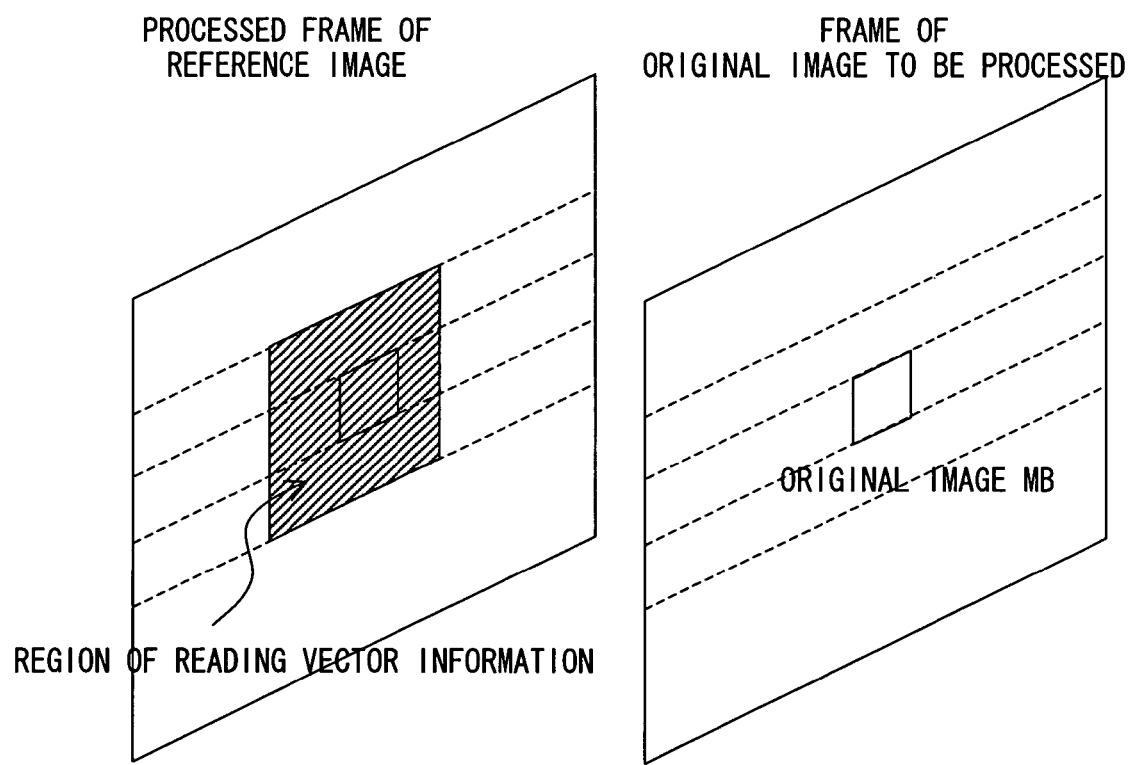
FIG. 6 shows examples of reading out the information regarding the MB close to an original image MB in a reference image.

FIG. 4 shows the operations of the motion vector detection device 2 of FIG. 2. FIG. 4(a) is a flowchart of the operations for each MB of the original image using the vector detection device 2. FIG. 4(b) is a time chart of these operations. The following explanation is made concentrating on FIG. 4(a). In FIG. 4, the motion vector detection device 2 first reads out vector information from the vector and estimation value data storage 40 in step 510. Each of FIGS. 5 and 6 shows the region of an MB to be read out at that time. FIG. 5 shows one example of reading out the information about an MB in a region (vector information reading region) where an original image has been processed (motion vector has been calculated). FIG. 6 shows one example of reading out the information about an MB (vector information reading out region) close to the original image MB in the processed reference image.

Then, the unit pattern determination/control 50 performs a statistics processing (step 520), predicts a vector occurrence tendency (step 530), determines a unit pattern (step 540) and informs the thus-determined unit pattern to the computation unit pattern controller 60, which is described later in detail.

On the other hand, in step 300, the vector detector 30 reads the data of an original image MB to be processed into the original image delay adjuster 16 from the original image MB storage 12. Then, in step 302, the computation unit pattern controller 60 determines a position of reading a search unit to be currently processed into the reference image from among search units notified from the unit pattern determination/control 50. In step 304, a search unit to be currently processed is read into the unit data timing adjuster 18 from the above-mentioned position stored in the reference image region storage 14. Subsequently, in step 306, the motion vector comparator 20 performs comparison-computation between the original image MB and the current search unit. In step 308, it compares the estimation values in a current unit and determines a motion vector candidate. In step 310, it is determined whether or not processings terminate for all the search units that are notified from the unit pattern determination/control 50. If not, a processing returns to step 302. In the case where the processings terminate, a process advances to step 312 and the motion vector of a current MB is determined. In step 314, the obtained motion vector is outputted and the processing for this MB terminates.

Here, a processing of determining a search unit pattern according to the present invention is explained in detail in steps 520 to 540. That is, a method of determining in which direction from among upward, downward, left, right and oblique directions a unit should be expanded based on a fundamental unit configuration, is explained. In the following explanation, as the information to be used for a statistics processing, the information about a motion vector of an MB in the vector information reading region of a reference image as shown in FIG. 6 or a processed frame other than the reference image are used in order to simplify the explanation. Of course, the information about an MB in a region of reading out the vector information of a frame being currently processed may be used for a statistics processing.

In statistics processing in step 520, the average and dispersion values of the motion vectors that are requested for, for example, a region of reading vector information that is set around a position corresponding to the original image MB of a reference image are calculated. FIG. 7 shows the average and dispersion values of the motion vectors that are obtained for the regions of reading vector information shown in FIG. 5 or 6. In FIG. 7, mean values of the horizontal and vertical components of a motion vector are represented with Avr-VecH and Avr-VecV, respectively. The dispersion values of the horizontal and vertical components of a motion vector are represented with Var-VecH and Var-VecV, respectively. The dispersion value is obtained as a difference absolute value sum or a difference square sum of the mean value and each motion vector.

Then, the occurrence tendency of a motion vector is predicted in step 530. FIG. 8 shows a mean value determination threshold (a) and a dispersion value determination threshold (b) in use for the analysis of a mean value and a dispersion value. Namely, as shown in FIG. 8, mean value determination thresholds BAHL and BAHR on the left and right sides of a horizontal component and mean value determination thresholds BAVU and BAVD on the upper and lower sides of a vertical component are set in advance. It is desirable to store these values in a ROM (Read Only Memory) of the unit pattern determination/control 50, which is not shown in the drawings. Also, it is desirable to set in advance the dispersion value determination thresholds BVH and BVV of horizontal and vertical components and these set thresholds are stored in the above-mentioned ROM.

Using the mean value and the four mean value determination thresholds obtained in step 520, it is determined whether or not a horizontal component mean value Avr-VecH corresponds to one of the left side, the centers and the right sides of horizontal component determination thresholds of BAHL and BAHR. In addition, it is also determined whether or not a vertical component mean value Avr-VecV corresponds to one of the upper sides, centers or lower sides of vertical component determination thresholds BAVU and BAVD. This determination is shown in FIG. 9(a). In this drawing, if a horizontal component mean value Avr-VecH is on the left side (smaller than) of the threshold BAHL, the determination is expressed by AHL and if it is on the right side (larger than) of the threshold BAHR, the determination is expressed by AHR. If Avr–VecH is between BAHL and BAHR, the determination is expressed by AHC to make a distinction. Similarly, if a vertical component mean value Avr-VecV is above (in the case where a vertical coordinate increases upwardly, smaller than) the threshold BAVU, the determination is expressed by AVU. If the value is below (in the case where a vertical coordinate increases downwardly, larger than) the threshold BAVD, the determination is expressed by AVD. Furthermore, if the value is between BAVU and BAVD, the determination is expressed by AVC to make a distinction.

Also, the values are compared using the dispersion value obtained in step 520 and the above-mentioned two dispersion value determination thresholds. That is, if the horizontal component dispersion value Var-VecH is equal to or less than the threshold BVH, the determination is expressed by VHH while if it is larger than the threshold BVH, the determination is expressed by VHL, as shown in FIG. 9(b). Similarly, if the vertical component dispersion value Var-VecV is equal to or less than the threshold BVV, the determination is expressed by VVH. If it is larger than the threshold BVH, the expression is expressed by VVL.

FIG. 10 is a tendency prediction table for predicting a motion vector appearance tendency using the results of both the mean value analysis and the dispersion value analysis performed on the basis of a table of FIG. 9. In FIG. 10, a horizontal component tendency is determined by the combination of AHL, AHR and AHC of the mean value analysis results of a horizontal component and VHH and VHL of the dispersion value analysis results of a horizontal component. A vertical component tendency is determined by combining AVL, AVR and AVC of the mean value analysis results of a vertical component and VVH and VVL of the dispersion value analysis results of a vertical component. For example, if the mean value analysis result of a horizontal component is AHL (horizontal component mean value Avr–VecH is on the left-side of the threshold BAHL) and the dispersion value analysis result is VHH (horizontal component dispersion value Avr–VecH is equal to or less than BVH), a horizontal component tendency becomes a "left side". Similarly, regarding a horizontal component, if the mean value analysis result is AHR and the dispersion value analysis result is VHH, the horizontal component tendency becomes a "right side". If the mean value analysis result is AHC or the dispersion value analysis result is VHL, the horizontal component tendency becomes a "center". Furthermore, regarding a vertical component, if the mean value analysis result is AVU and the dispersion value analysis result is VVH, the vertical component tendency becomes an "upper side". If the mean value analysis result is AVD and the dispersion value analysis result is VVH, the vertical component tendency becomes a "lower side". If the mean value analysis result is AVC or the dispersion value analysis result is VVL, the vertical component tendency becomes a "center".

Then, in step 540, a unit pattern is determined on the basis of the unit pattern determination table of FIG. 11 using the combination of a horizontal component tendency (hereinafter, referred to as horizontal tendency) and a vertical component tendency (hereinafter, referred to as vertical tendency) of the tendency prediction table of FIG. 10. Namely, in the unit pattern determination table, in the case where the vertical tendency is central, a search unit is expanded to a horizontal tendency side (unit patterns 1 and 2). In the case where the horizontal tendency is central, a search unit is expanded to a vertical tendency (unit patterns 3 and 4). In the case other than the above-mentioned cases, a search unit is expanded in accordance with the combination of a horizontal tendency and a vertical tendency. For example, if a horizontal tendency is the left side and a vertical tendency is the upper side, a search unit is expanded in an upper-left direction (unit patterns 5 to 8). In the case where both a horizontal tendency and a vertical tendency are "central" as shown in FIG. 11, a search unit need not be expanded so that no expansion is performed for a fundamental unit configuration.

Figure 12:
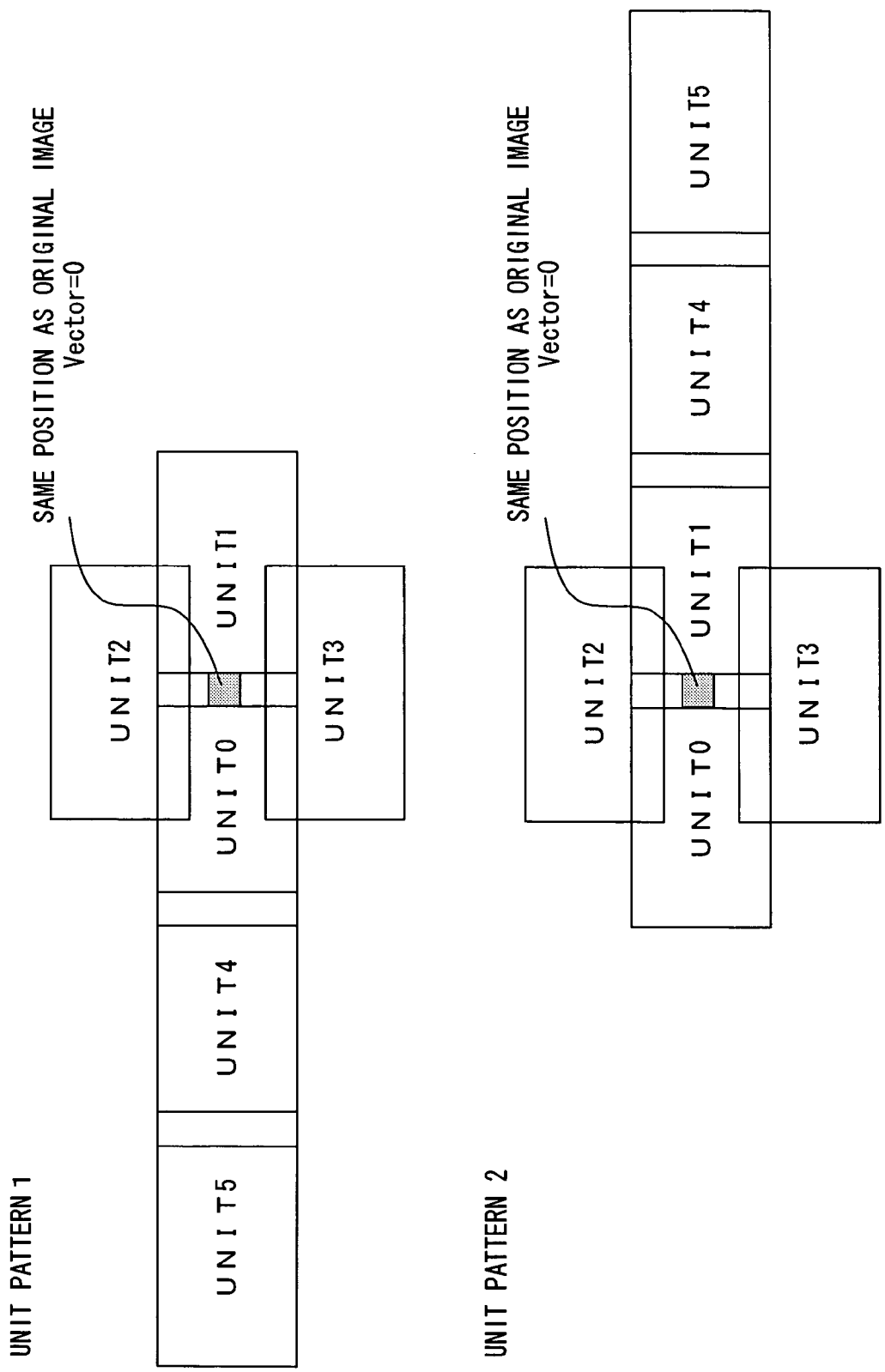
FIG. 12 shows examples of reference image region expansion in a horizontal direction.
Figure 14:
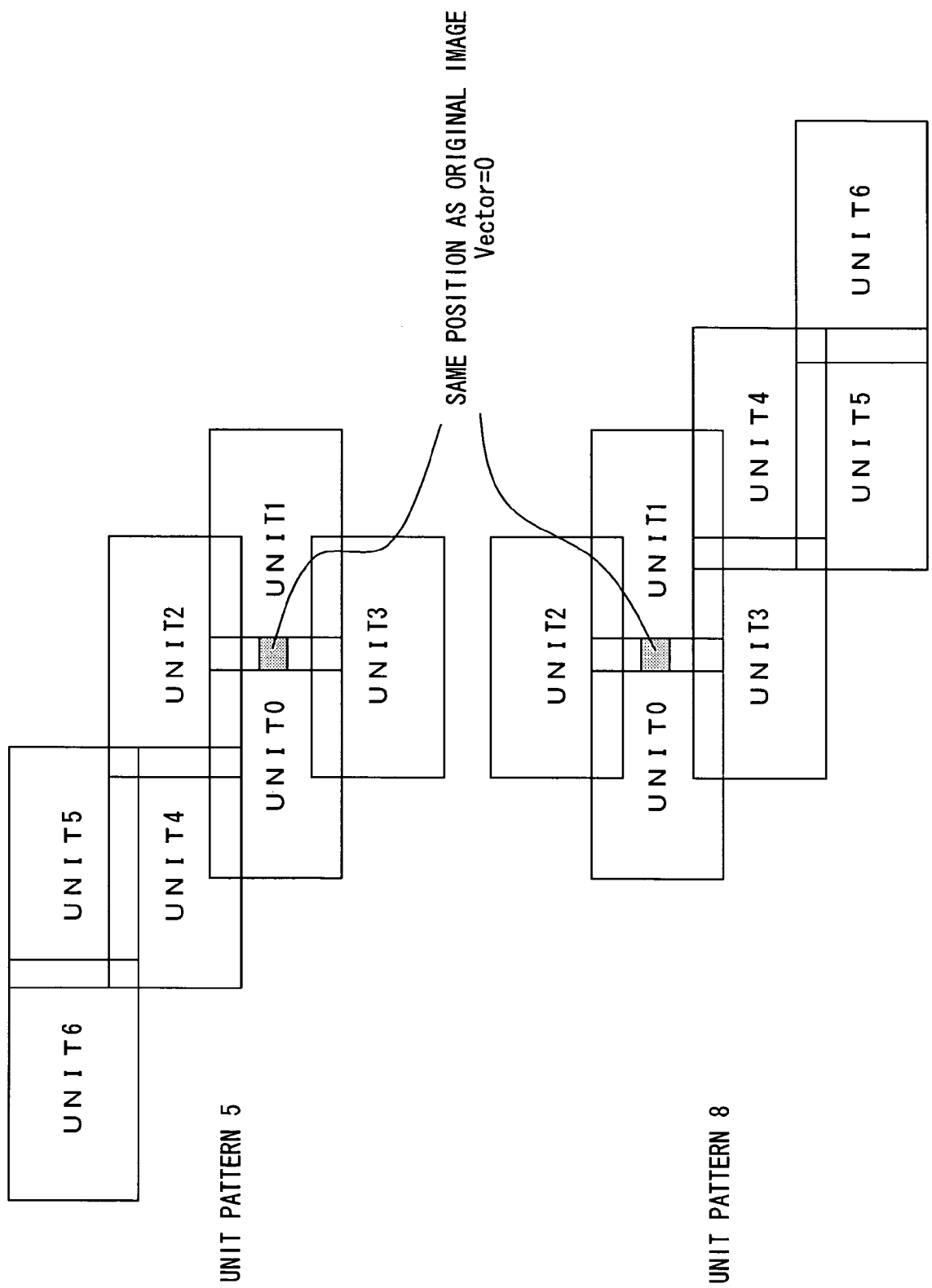
FIG. 14 shows examples of the reference image region expansion in an oblique direction.
Figure 15:
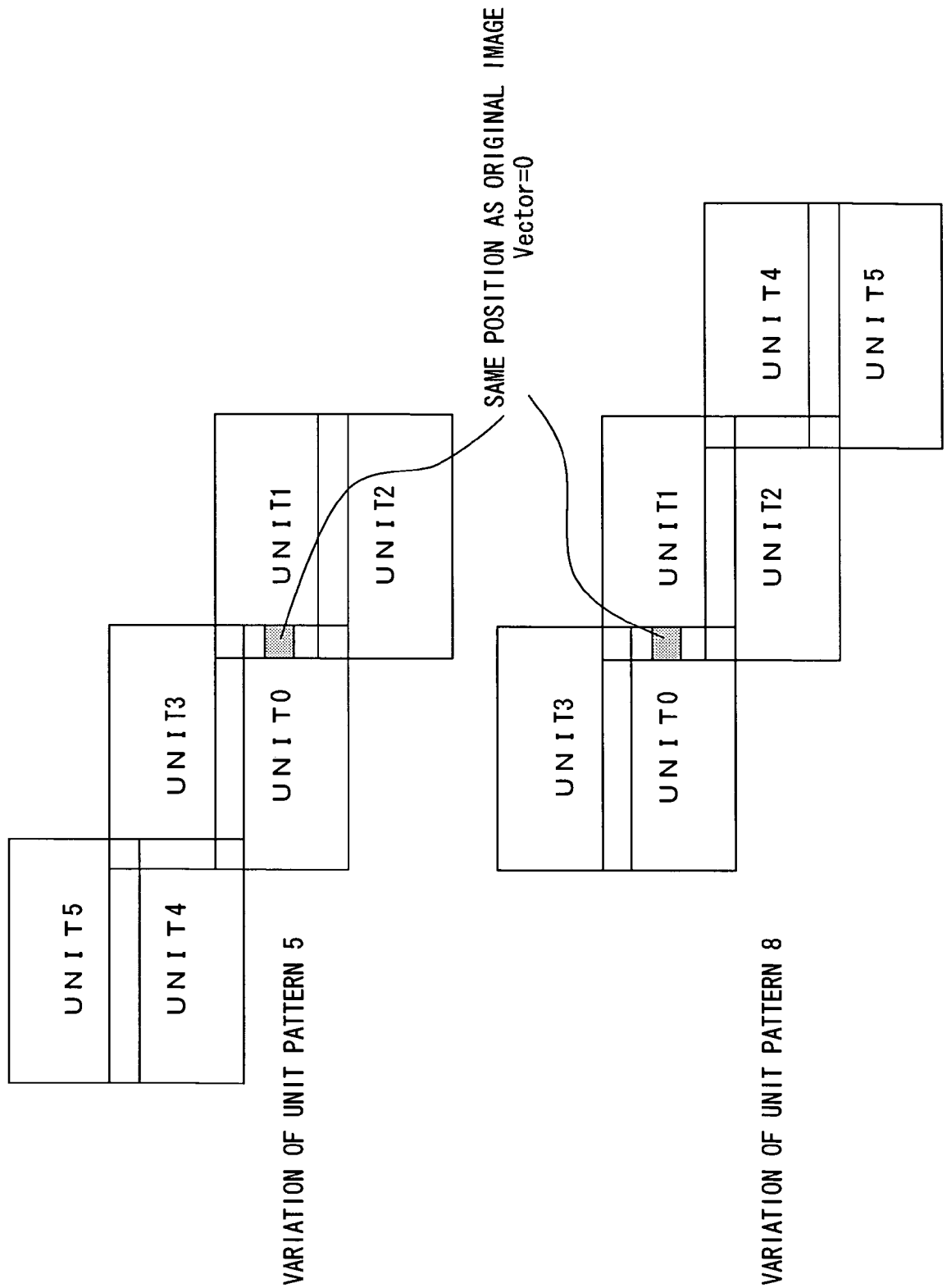
FIG. 15 shows variant examples of the reference image region expansion in an oblique direction.

The examples of a unit pattern are shown in FIGS. 12 to 15. In FIG. 12, a unit pattern 1 shows one example of left expansion while a unit pattern 2 shows one example of right expansion. In FIG. 13, a unit pattern 3 shows one example of upward expansion while a unit pattern 4 shows one example of downward expansion of the fundamental unit configuration. In FIG. 14, a unit pattern 5 shows one example of expanding a fundamental unit configuration in a left-upward direction while a unit pattern 8 shows one example of expanding a fundamental unit configuration in a right downward direction. In the case where a search unit is expanded in an oblique direction, instead of directly expanding the fundamental unit configuration, units 2 and 3 sandwich units 0 and 1 and perform expansion in an oblique direction as shown in the unit patterns 5 and 8 in FIG. 15.

The unit patterns 1 to 8 as shown in FIGS. 12 to 15 are defined in advance and one of these unit patterns may be selected on the basis of the unit pattern determination result using the unit pattern determination table in step 540. Otherwise, the fundamental unit configuration may be expanded by the predetermined number of units on the basis of the unit pattern determination result.

A motion vector can be obtained by performing operations in steps 300 to 314 of FIG. 4 as mentioned above on the basis of the unit patterns determined in this way.

Control of the Number of Processing Units

Furthermore, according to the present invention, the unit pattern determination/control 50 not only performs computation and determines a search unit pattern but also determines the number of processing units and outputs the number to the operation unit pattern controller 60.

Figure 17:
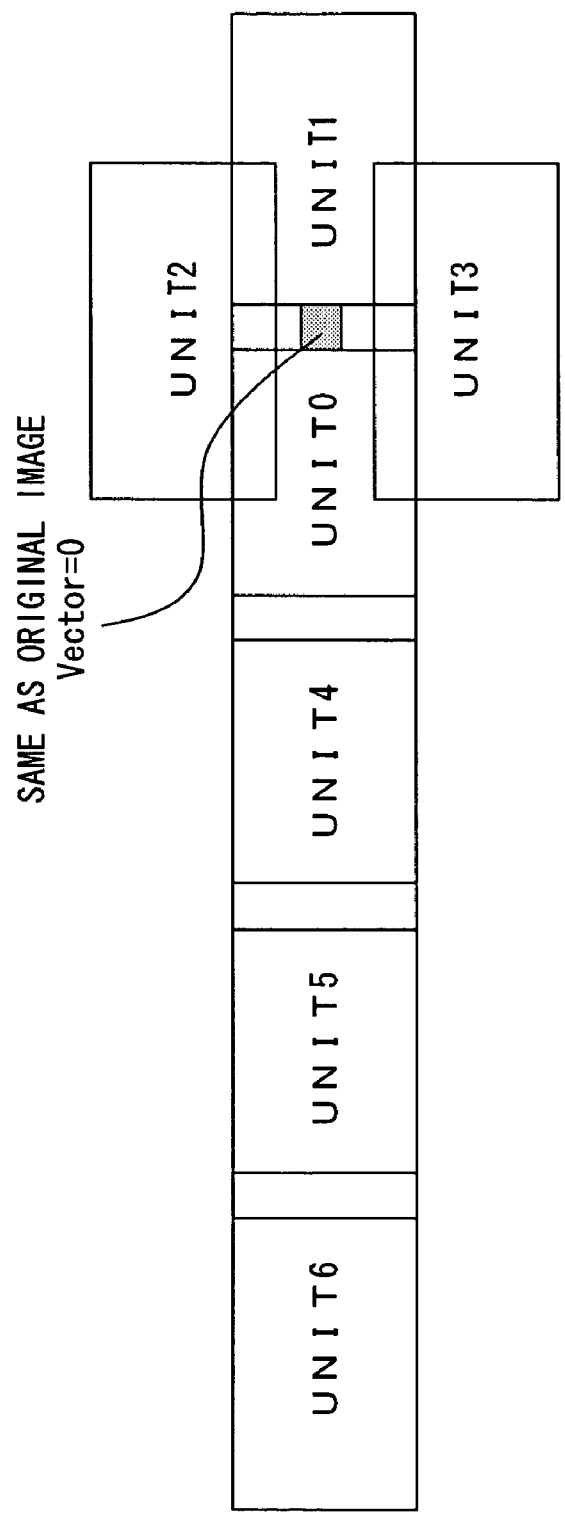
FIG. 17 shows one example of the expansion of a search region by increasing the number of processing units of a unit pattern 1.
Figure 18:
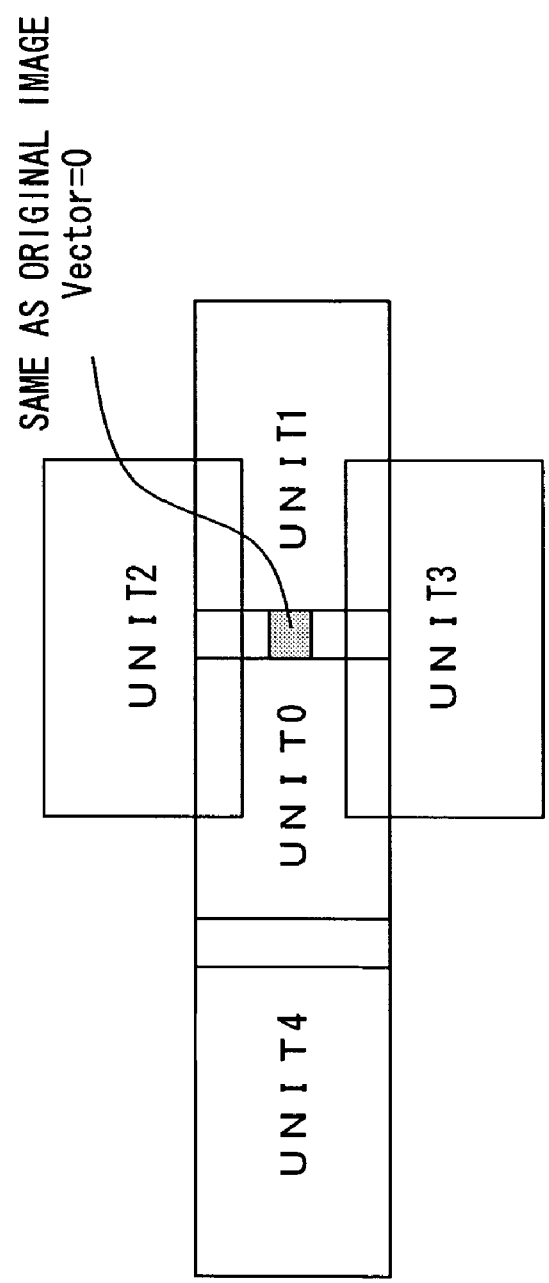
FIG. 18 shows one example of the decrease of a search region by decreasing the number of processing units of a unit pattern 1.
Figure 19:
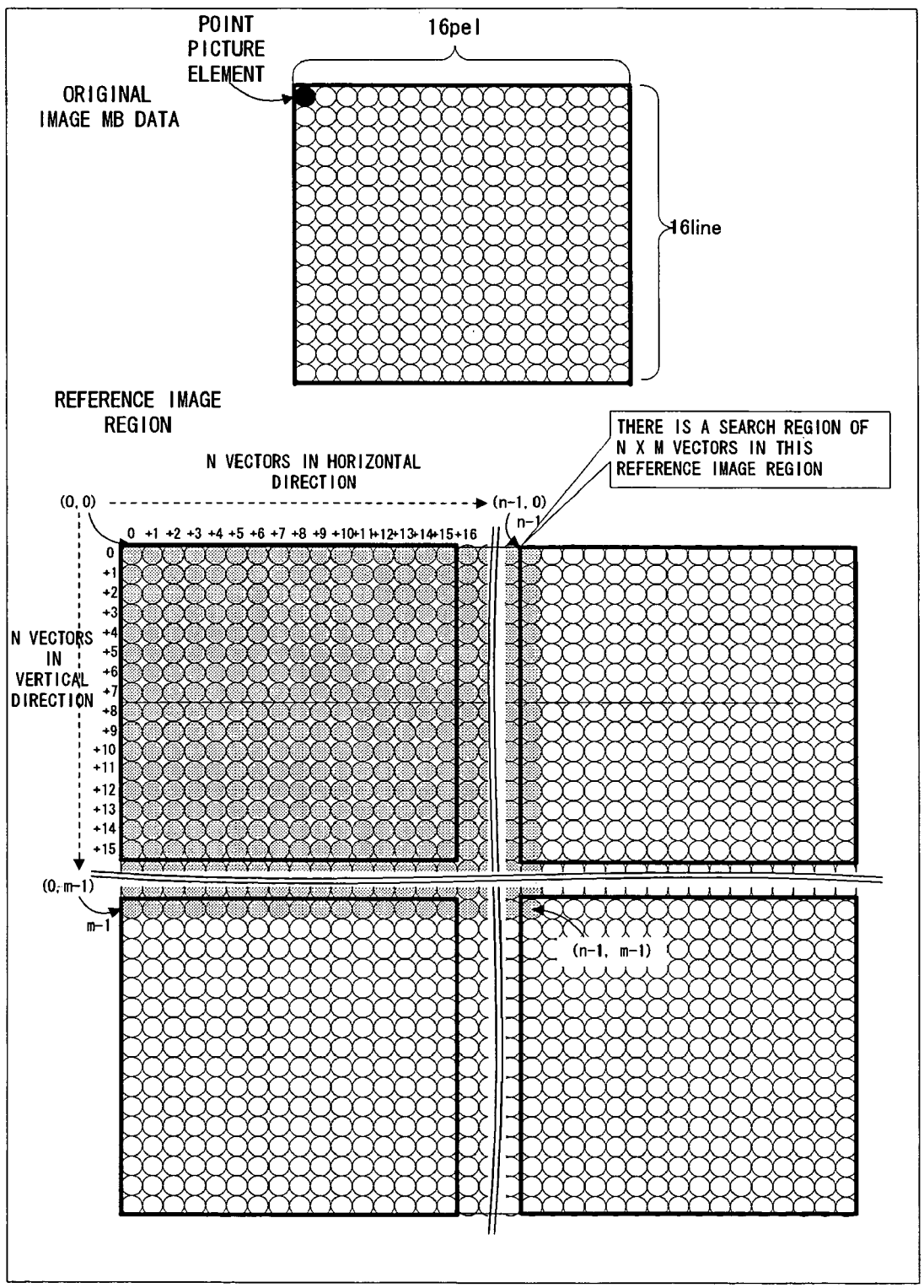
FIG. 19 shows the relation between original image MB data and a reference image region.

As mentioned above, the priority order of unit processing is determined as shown in FIG. 3 and FIGS. 12 to 15 so that the units are processed in the order of UNIT0, UNIT1, UNIT2, etc. In the case where the number of units of unit patterns that is determined in the unit pattern determination processing in step 540 exceeds the number of processing units that is determined by the unit pattern determination/control 50, the motion vector of an MB thereof is determined when the processings for the units of the determined number terminates. FIG. 18 shows an example in the case where the number of processing units is five and a unit pattern 1 of which the original unit number is six is restricted by the designated number of processing units so that the search region is reduced. On the contrary, in the case where the designated number of processing units is seven as shown in FIG. 17, the unit pattern 1 is expanded by one unit so that the search region is expanded.

Meanwhile, the designated number of processing units should be within a range where the motion vector detection device 2 can perform motion vector detection processing in these processing units.

Figure 16:
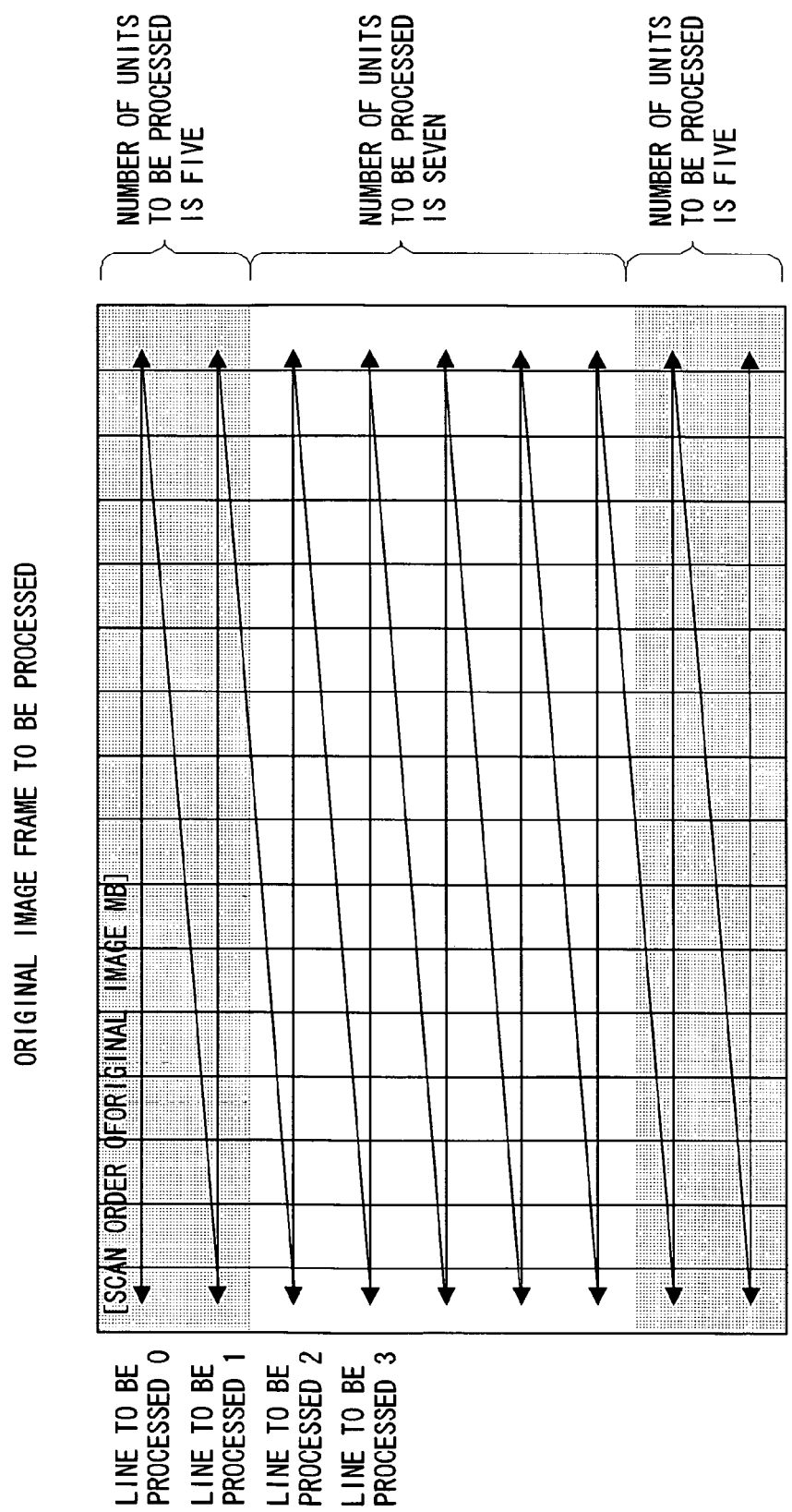
FIG. 16 shows the control of the number of units in the same frame.

As shown in FIG. 16, a control of the number of processing units is performed in such a way that the number of processing units is restricted in the neighborhood of the upper and lower ends of a screen in the same frame and the surplus power of the computing power generated by this restriction is assigned to the neighborhood of the center of the screen. In the example of FIG. 16, the number of processing units is restricted to five in two processing lines on an upper-side and three processing lines on a lower-side of a screen while the number of processing units is restricted to seven in other lines.

It is also possible to share processing capability among several frames as well as in one frame. In other words, a small processing amount is allocated beforehand to the frame of which movement is expected small and the surplus processing capability is allocated to other frames. The prediction of whether the movement of an original image is large or small can be performed on the basis of the whole statistics of a frame immediately before.

What is claimed is:

1. In a motion vector detection apparatus for, in order to obtain a motion vector between a reference image and a current original image, matching and searching, with a macroblock (MB) currently processed in the original image, a search region of the reference image which region is set around a position corresponding to the macroblock (MB), a method of determining the search region comprising:

determining, using a computer having a processor, a search unit with a size and a ratio of height to width such that the search region made up of an aggregation of the search units suitable for the configuration of the search region can be configured;

obtaining a statistics amount of obtained motion vectors in a vector information readout region of the original image set around a position of the MB being processed or in a vector information readout region of the reference image set around a position corresponding to the MB being processed;

analyzing the statistics amount with the processor, thereby predicting an appearance tendency of a motion vector; and deciding with the processor, a combination of search units so as to form an expanded search region expanded in a direction to increase an occurrence probability of a motion vector for the MB being processed based on the analysis, wherein: the obtaining includes calculating with the processor, a vector mean value and a vector dispersion value of the obtained motion vectors in the vector information readout region; and the analyzing includes performing an analysis for the vector mean value and the vector dispersion value based on a predetermined mean value threshold and a dispersion value threshold.

2. The method of determining a search region according to claim 1, further comprising:
  setting a fundamental unit configuration obtained by combining a comparatively small number of search units; and
  preparing beforehand predetermined unit patterns for expanding search units in each of omnidirectional, upper-right, lower-right, upper-left and lower-left directions in respect of the fundamental unit configuration, wherein
  the deciding comprises selecting one of the predetermined unit patterns based on the analysis.

3. The method of determining a search region according to claim 2, wherein:
  the mean value threshold includes left-side and right-side thresholds of a horizontal component and upper-side and lower-side thresholds of a vertical component;
  the analyzing, comprises judging a relative horizontal position relation between the left-side and right-side thresholds of a horizontal component of the vector mean value and a relative vertical position relation between the upper-side and lower-side thresholds of a vertical component of the vector mean value; and
  the deciding, comprises selecting a unit pattern in which a search unit is expanded in a direction determined by the relative horizontal position relation and the relative vertical position relation.

4. The method of determining a search region according to claim 2, wherein the predetermined unit pattern includes a unit pattern with a search unit configuration suitable for a search region in an oblique direction instead of/in addition to a unit pattern that is obtained by expanding the fundamental unit configuration in an oblique direction.

5. The method of determining a search region according to claim 1, further comprising setting a fundamental unit configuration obtained by combining a comparatively small number of search units, wherein
  the deciding, comprises expanding a search unit in any direction of omnidirectional, upper-right, lower-right, upper-left and lower-left directions in respect of a fundamental unit configuration based on the analysis.

6. The method of determining a search region according to claim 5, wherein in a case where the fundamental configuration is expanded in an oblique direction, the expanding, comprises, changing the fundamental unit configuration into a unit suitable for a search unit in an oblique direction and performing an extension.

7. The method of determining a search region according to claim 5, comprising performing an expansion after changing the fundamental unit configuration into a unit suitable for a search unit in an oblique direction in a case where the fundamental configuration is expanded in an oblique direction.

8. The method of determining a search region according to claim 1, wherein:
  the mean value threshold comprises left-side and right-side thresholds of a horizontal component and upper-side and lower side thresholds of a vertical component; and
  the dispersion value threshold comprises a horizontal dispersion value threshold of a horizontal component and a vertical dispersion value threshold of a vertical component.

9. The method of determining a search region according to claim 8, wherein:
  the analyzing, comprises assigning horizontal classification including a left side, a right side and a horizontal center as a comparison result of a horizontal component of the vector mean value, the left-side threshold and the right-side threshold and vertical classification including an upper side, a lower side and a vertical center as a comparison result of a vertical component of the vector mean value, the upper-side threshold and the lower side threshold; and
  the deciding selects a unit pattern obtained by expanding a search unit in a direction based on the horizontal classification and the vertical classification.

10. The method of determining a search region according to claim 8, wherein: the analyzing, comprises:
  assigning horizontal classification including a left side, a right side and a horizontal center as a comparison result of a horizontal component of the vector mean value, the left-side threshold and the right-side threshold and vertical classification including an upper side, a down side and a vertical center as a comparison result of a vertical component of the vector mean value, the upper-side threshold and the lower-side threshold; and acquiring a horizontal dispersion determination value showing whether or not a horizontal component of the vector dispersion value is greater than the horizontal dispersion value threshold; a vertical dispersion determination value showing whether or not a vertical component of the vector dispersion value is greater than the vertical dispersion value threshold; a horizontal component tendency in which an appearance tendency of a motion vector in a horizontal direction is represented by one of a right side, a center and a left side using a combination of the horizontal classification and the horizontal dispersion determination value; and a vertical component tendency in which an appearance tendency of a motion vector in a vertical direction is represented by one of an upper side, a center and a lower side using a combination of the vertical classification and the vertical dispersion determination value, wherein
  the deciding a unit pattern that expands a search unit in a direction based on the horizontal classification and the vertical classification.

11. The method of determining a search region according to claim 10, further comprising: making a determination on a number of processing units representing a number of search units to be searched for the MB being processed; and in a case where the number of processing units does not satisfy a number of search units for configuring the selected unit pattern, restricting the number of search units to the number of processing units.

12. The method of determining a search region according to claim 11, further comprising adding a shortfall of search units to the selected unit pattern in a case where the number of processing units exceeds a number of search units for configuring the selected unit pattern.

13. The method of determining a search region according to claim 10, further comprising:
  making a determination on a number of processing units representing a number of search units to be searched for the MB being processed; and
  adding a shortfall of search units to the selected unit pattern in a case where the number of processing units exceeds a number of search units for configuring the selected unit pattern.

14. The method of determining a search region according to claim 8, wherein the predetermined unit pattern includes a unit pattern with a search unit configuration suitable for a search region in an oblique direction instead of/in addition to a unit pattern that is obtained by expanding the fundamental unit configuration in an oblique direction.

15. The method of determining a search region according to claim 1, wherein the predetermined unit pattern includes a unit pattern with a search unit configuration suitable for a search region in an oblique direction instead of/in addition to a unit pattern that is obtained by expanding the fundamental unit configuration in an oblique direction.

16. A motion vector detection apparatus for, in order to obtain a motion vector between a reference image and a current original image, comparing and searching for search regions of the reference image with a position corresponding to a macroblock (MB) as a center, in which the original image is being processed, in the MB, comprising:

- a determination circuit determining the search unit with a size and a ratio of height to width such that the search region made up of aggregation of the search units suitable for the configuration of the search region can be configured;
- a statistics calculation circuit obtaining a statistics amount of obtained motion vectors in a vector information readout region of the original image with a position corresponding to the MB being processed as a center or in a vector information readout region of the reference image with a position corresponding to the processing MB as a center;
- an analysis circuit analyzing the statistics amount, thereby predicting an appearance tendency of a motion vector by; and
- a decision circuit deciding a combination of search units in such a way that an expanded search region is formed in such a direction as to increase an occurrence probability of a motion vector for an MB being processed based on the analysis, wherein the statistics calculation circuit calculates a vector means value and a vector dispersion value of the obtained motion vectors in the vector information readout region and the analysis circuit performs an analysis for the vector mean value and the vector dispersion value based on a predetermined mean value threshold and a dispersion value threshold.

* * * * *